(12) United States Patent
Ueda et al.

(10) Patent No.: US 9,605,146 B2
(45) Date of Patent: Mar. 28, 2017

(54) THERMOPLASTIC RESIN COMPOSITION, MOLDED ARTICLE AND COATED MOLDED ARTICLE

(71) Applicant: ASAHI KASEI CHEMICALS CORPORATION, Tokyo (JP)

(72) Inventors: Yoshikazu Ueda, Tokyo (JP); Takayuki Wakita, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 0 days.

(21) Appl. No.: 14/783,661

(22) PCT Filed: Apr. 22, 2014

(86) PCT No.: PCT/JP2014/061298
§ 371 (c)(1),
(2) Date: Oct. 9, 2015

(87) PCT Pub. No.: WO2014/175271
PCT Pub. Date: Oct. 30, 2014

(65) Prior Publication Data
US 2016/0046804 A1  Feb. 18, 2016

(30) Foreign Application Priority Data
Apr. 23, 2013  (JP) ................................ 2013-090801

(51) Int. Cl.
| | |
|---|---|
| *C08L 69/00* | (2006.01) |
| *C08L 55/00* | (2006.01) |
| *C08J 5/18* | (2006.01) |
| *C08L 25/12* | (2006.01) |
| *C08F 220/44* | (2006.01) |
| *C08F 236/06* | (2006.01) |

(52) U.S. Cl.
CPC ................. *C08L 69/00* (2013.01); *C08J 5/18* (2013.01); *C08L 25/12* (2013.01); *C08L 55/00* (2013.01); *C08F 220/44* (2013.01); *C08F 236/06* (2013.01); *C08J 2369/00* (2013.01); *C08J 2433/06* (2013.01); *C08J 2433/20* (2013.01); *C08J 2453/02* (2013.01); *C08L 2205/03* (2013.01); *C08L 2207/04* (2013.01)

(58) Field of Classification Search
CPC .......... C08L 69/00; C08L 55/00; C08L 25/12; C08L 2205/03; C08L 2207/04; C08J 5/18; C08J 2433/20; C08J 2433/06; C08J 2369/00; C08J 2453/02; C08F 220/44; C08F 236/06

USPC ........................................................ 524/504
See application file for complete search history.

(56) References Cited

FOREIGN PATENT DOCUMENTS

| | | | |
|---|---|---|---|
| EP | 1 865 028 A1 | | 12/2007 |
| JP | 5-17680 A | | 1/1993 |
| JP | 2002-20612 A | | 1/2002 |
| JP | 2002-194100 A | | 7/2002 |
| JP | 2002194100 A | * | 7/2002 |
| JP | 2003-183490 A | | 7/2003 |
| JP | 2003-268225 A | | 9/2003 |
| JP | 2003268225 A | * | 9/2003 |
| JP | 2004-99723 A | | 4/2004 |
| JP | 2004099723 A | * | 4/2004 |
| JP | 2005-68349 A | | 3/2005 |
| JP | 2005068349 A | * | 3/2005 |
| JP | 2009-292921 A | | 12/2009 |
| JP | 2009292921 A | * | 12/2009 |
| JP | 2012-207214 A | | 10/2012 |

OTHER PUBLICATIONS

European Search Report dated Mar. 16, 2016 for Application No. 14787636.1.
International Preliminary Report on Patentability and English translation of the Written Opinion of the International Searching Authority (PCT/IB/326, PCT/IB/373 and PCT/ISA/237) dated Nov. 5, 2015 for Application No. PCT/JP2014/061298.
International Search Report, issued in PCT/JP2014/061298, dated May 27, 2014.

* cited by examiner

*Primary Examiner* — Michael M Bernshteyn
(74) *Attorney, Agent, or Firm* — Birch, Stewart, Kolasch & Birch, LLP

(57) ABSTRACT

A thermoplastic resin composition, comprising:
an aromatic polycarbonate (A);
a copolymer mixture (B) comprising a copolymer (b1) of a vinyl cyanide-based monomer and one or more kinds of monomers copolymerizable with said vinyl cyanide-based monomer, and a graft copolymer (b2) of a vinyl cyanide-based monomer, one or more kinds of monomers copolymerizable with said vinyl cyanide-based monomer and a rubbery polymer; and
at least one kind of metal atom selected from the group consisting of Mg, Al and Ca,
wherein the copolymer mixture (B) comprises an acetone-soluble component,
wherein said acetone-soluble component has at least two peak tops, being peak top 1 and peak top 2, within the range of 15 to 50% of vinyl cyanide component content rate, when measuring the vinyl cyanide component content rate by high performance liquid chromatography,
wherein the peak top 1 is present in the range of 15% or more to 30% or less of vinyl cyanide component content rate,
wherein the peak top 2 is present in the range of from more than 30% to 50% or less of vinyl cyanide component content rate, and
wherein the total content of the metal atoms is 10 to 1000 ppm, based on 100 parts by mass of total amount of the aromatic polycarbonate (A) and the copolymer mixture (B).

14 Claims, 2 Drawing Sheets

THERMOPLASTIC RESIN COMPOSITION, MOLDED ARTICLE AND COATED MOLDED ARTICLE

TECHNICAL FIELD

The present invention relates to a thermoplastic resin composition, a molded body containing the thermoplastic resin composition, and a coated molded body.

BACKGROUND ART

A resin composition obtained by graft copolymerization of a vinyl cyanide compound and an aromatic vinyl compound to a rubbery polymer is known as an acrylonitrile-butadiene-styrene resin (hereinafter, it may also be referred to as "ABS-based resin"), and has been utilized widely in a wide range of fields, for example, in automobiles, home electric appliances fields, etc., because of having superior mechanical characteristics, or good molding processability.

There has also been carried out widely a modification method by adding a polycarbonate resin, for the purpose of giving impact resistance and/or heat resistance to the ABS-based resin. These compositions composed of the ABS-based resin and the polycarbonate resin (hereafter, it may also be referred to as a "PC/ABS-based resin") improve heat resistance and impact resistance, as compared with the case of using the ABS-based resin alone, and give superior molding processability, as compared with the case of using the polycarbonate resin alone, therefore, they have been utilized widely in automobiles, home electric appliances, electric-electronics equipment fields, etc., as resins having superior property balance, which mutually compensate shortage points of each resin of the ABS-based resin and the polycarbonate resin.

In the case where a molded body composed of the PC/ABS-based resin composition is used in these applications, coating is often carried out from the viewpoint of design property, surface protection, furnishing of weather resistance, etc. In particular, in vehicle applications, there are many cases where high image clarity of a coated surface is required. However generally, there has been a problem that it is difficult to obtain a coated article having high image clarity by the PC/ABS-based resin.

To solve this problem, there has been proposed a method for improving paintability of the PC/ABS-based resin, for example, by adding a crystalline polyolefin-based resin to the PC/ABS-based resin (for example, see PATENT LITERATURE 1).

CITATION LIST

Patent Literature

PATENT LITERATURE 1: Japanese Patent Laid-Open Publication No. 05-17680

SUMMARY OF INVENTION

Technical Problem

However, this method still has left a problem of decrease in smoothness of the PC/ABS-based resin composition surface, and low image clarity of the coated surface even after coating, by adding the crystalline polyolefin-based resin. Also in this method, the fracture surface after impact becomes the shape like a saw blade, for example, in vehicular applications, when parts are damaged in accident etc., this method has a problem of giving a danger to passengers.

The present invention has been made in view of the above-described problems, and it is an object to provide the thermoplastic resin composition being superior in impact resistance and heat resistance of the obtained molded body, and superior in balance of image clarity after coating the molded body, coating film adhesion and scratch resistance, a molded body containing the thermoplastic resin composition, and a coated molded body.

Solution to Problem

The present inventors, after intensive study, have found that, by adding an aromatic polycarbonate (A) and a copolymer mixture (B), the above-described problems can be solved, and have thus completed the present invention.

That is, the present invention is as follows.

[1]

The thermoplastic resin composition, comprising:

the aromatic polycarbonate (A);

the copolymer mixture (B) comprising a copolymer (b1) of a vinyl cyanide-based monomer, and one or more kinds of monomers copolymerizable with the vinyl cyanide-based monomer, and a graft copolymer (b2) of a vinyl cyanide-based monomer, one or more kinds of monomers copolymerizable with the vinyl cyanide-based monomer and a rubbery polymer; and at least one kind of metal atom selected from the group consisting of Mg, Al and Ca, wherein the copolymer mixture (B) comprises an acetone-soluble component, wherein the acetone-soluble component has at least two peak tops, being peak top 1 and peak top 2, within the range of 15 to 50% of vinyl cyanide component content rate, when measuring the vinyl cyanide component content rate by high performance liquid chromatography, wherein the peak top 1 is present in the range of 15% or more to 30% or less of vinyl cyanide component content rate, wherein the peak top 2 is present in the range of from more than 30% to 50% or less of vinyl cyanide component content rate, and wherein the total content of the metal atoms is 10 to 1000 ppm, based on 100 parts by mass of total amount of the aromatic polycarbonate (A) and the copolymer mixture (B).

[2]

The thermoplastic resin composition according to [1], wherein a ratio of the peak area of the peak top 1 to the peak area of the peak top 2 is 90/10 to 10/90.

[3]

The thermoplastic resin composition according to [1] or [2], wherein the difference between the vinyl cyanide component content rate of the peak top 1, and the vinyl cyanide component content rate of the peak top 2 is 5% or more.

[4]

The thermoplastic resin composition according to any one of [1] to [3], wherein volume average particle size of the rubbery polymer is from 50 to 1000 nm.

[5]

The thermoplastic resin composition according to any one of [1] to [4], having one phase comprising the aromatic polycarbonate (A), and two phases comprising the copolymer (b1), in morphology observed by a transmission electron microscope.

[6]

The molded body obtained by injection molding of the thermoplastic resin composition according to any one of [1] to [5] by a heating cylinder having a preset temperature of from 230 to 300° C.

[7]

The coated molded body comprising the molded body according to [6], wherein the molded body has at least one coated layer.

Advantageous Effects of Invention

According to the present invention, it is possible to provide a thermoplastic resin composition being superior in impact resistance and heat resistance when it is molded into a molded body, and superior in balance of image clarity after coating the molded body, coating film adhesion and scratch resistance; a molded body containing the thermoplastic resin composition; and a coated molded body.

DESCRIPTION OF EMBODIMENTS

Figure 1:
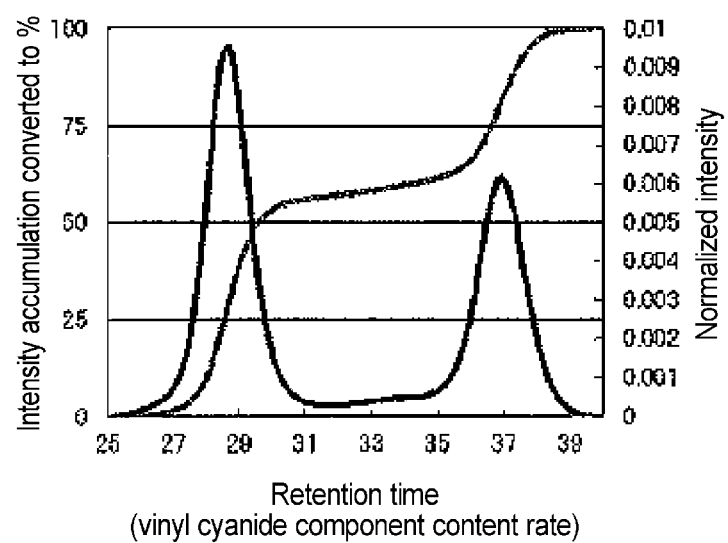
FIG. 1 is a schematic diagram of a spectrum of the content rate of a vinyl cyanide component measured by high performance liquid chromatography (HPLC) of an acetone-soluble component of a thermoplastic resin composition pertaining to the present embodiment.

Explanation will be given below in detail on embodiments for carrying out the present invention (hereafter, it is referred to as the present embodiment), however, the present invention should not be limited to this, and various modifications are possible without departing from the gist thereof.

[Thermoplastic Resin Composition]

The thermoplastic resin composition (hereafter it may also be referred to as the "resin composition") of the present embodiment comprises:

an aromatic polycarbonate (A);

a copolymer mixture (B) comprising a copolymer (1) of a vinyl cyanide-based monomer, and one or more kinds of monomers copolymerizable with the vinyl cyanide-based monomer, and a graft copolymer (b2) of a vinyl cyanide-based monomer, one or more kinds of monomers copolymerizable with the vinyl cyanide-based monomer and a rubbery polymer; and at least one kind of metal atom selected from the group consisting of Mg, Al and Ca, wherein the copolymer mixture (B) contains an acetone-soluble component, wherein the acetone-soluble component has at least two peak tops, being peak top 1 and peak top 2, within the range of 15 to 50% of vinyl cyanide component content rate, when measuring the vinyl cyanide component content rate by high performance liquid chromatography, wherein the peak top 1 is present in the range of 15% or more to 30% or less of vinyl cyanide component content rate, wherein the peak top 2 is present in the range of from more than 30% to 50% or less of vinyl cyanide component content rate, and wherein the total content of the metal atoms is 10 to 1000 ppm, based on 100 parts by mass of total amount of the aromatic polycarbonate (A) and the copolymer mixture (B).

[Aromatic Polycarbonate (A)]

The thermoplastic resin composition contains the aromatic polycarbonate (A). Such an aromatic polycarbonate (A) is not particularly limited, and includes, for example, a homopolymer having the aromatic polycarbonate unit represented by the following chemical formula, or a copolymer having the aromatic polycarbonate unit represented by the following chemical formula and a non-aromatic polycarbonate unit. The aromatic polycarbonate (A) may be a branched one or a non-branched one.

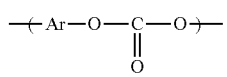

(wherein Ar is a divalent hydrocarbon group having an aromatic group).

The aromatic polycarbonate (A) can be obtained by reacting an aromatic hydroxy compound with phosgene or carbonate diester, or reacting the aromatic hydroxy compound and a non-aromatic hydroxy compound with phosgene or a carbonate diester. It should be noted that a production method of the aromatic polycarbonate (A) is not limited to the above-described method, and any method may be used, as long as it is a usually known method. Specifically, it includes an interface polymerizing method including a phosgene method, and a transesterification including a melting method. Among these, such one is preferable that is produced by the melting method, and produced by adjusting the content of OH group in the terminal group.

An aromatic dihydroxy compound, which is a raw material of the aromatic polycarbonate (A), is not particularly limited, and includes, for example, 2,2-bis(4-hydroxyphenyl)propane (trivial name: bisphenol A), tetrabisphenol A, bis(4-hydroxyphenyl)-p-diisopropylbenzene, hydroquinone, resorcinol, 4,4-dihydroxydiphenyl, etc. Among these, bisphenol A is preferable.

It should be noted that a branched aromatic polycarbonate (A) can be obtained by using an aromatic hydroxy compound having three or more hydroxyl groups. Such a aromatic polyhydroxy compound is not particularly limited, and includes, for example, a polyhydroxy compound, such as phloroglucin, 4,6-dimethyl-2,4,6-tri(4-hydroxyphenyl) heptene-2,4,6-dimethyl-2,4,6-tri(4-hydroxyphenyl)heptane, 2,6-dimethyl-2,4,6-tri(4-hydroxyphenyl)heptene-3,1,3,5-tri (4-hydroxyphenyl)benzene, 1,1,1-tri(4-hydroxyphenyl)ethane; 3,3-bis(4-hydroxyaryl)oxyindol (trivial name: isatin bisphenol), 5-chlorisatin, 5,7-dichlorisatin, 5-bromisatin, etc.

Use amount of the aromatic hydroxyl compound having three or more hydroxyl groups is preferably 0.010 to 10% by mole, and more preferably 0.10 to 2.0% by mole, based on total amount 100% by mole of the aromatic hydroxyl compound. When the use mount of the branched aromatic dihydroxyl compound is in the above-described range, balance of fluidity of the thermoplastic resin composition and impact resistance of the obtained molded body tends to be more superior.

Weight average molecular weight (hereafter it may also be referred to as "Mw") of the aromatic polycarbonate (A) is preferably 10000 or more, more preferably 20000 to 500000, and still more preferably 25000 to 300000. When Mw is 10000 or more, improvement effect of mechanical strength, such as heat distortion temperature, bending strength, impact resistance, of the ABS-based resin in the PC/ABS-based resin tends to be better. In addition, when Mw is 500000 or less, molding processability tends to be more superior. Weight average molecular weight of the aromatic polycarbonate (A) can be measured by gel permeation chromatography (hereafter it may also be referred to as "GPC").

Content of the aromatic polycarbonate (A) is preferably 5 to 95 parts by mass, more preferably 20 to 90 parts by mass, and still more preferably 30 to 80 parts by mass, based on 100 parts by mass of total of the aromatic polycarbonate (A) and the copolymer mixture (B). When the content of the aromatic polycarbonate (A) is 5% by mass or more, modification effect of heat resistance and impact resistance by the addition of the aromatic polycarbonate (A), tends to be more superior. In addition, when the content of the aromatic polycarbonate (A) is 95% by mass or less, improvement effect of processability, image clarity after coating, coating film adhesion, and scratch resistance after coating, by the addition of the copolymer mixture (B), tends to be more superior.

[Copolymer Mixture (B)]

The thermoplastic resin composition comprises the copolymer mixture (B) comprising the copolymer (b1) of a vinyl cyanide-based monomer and one or more kinds of monomers copolymerizable with the vinyl cyanide-based monomer, and the graft copolymer (b2) of a vinyl cyanide-based monomer, one or more kinds of monomers copolymerizable with the vinyl cyanide-based monomer and a rubbery polymer When the copolymer mixture (B) comprises the copolymer (b1), balance of impact resistance, scratch resistance, image clarity after coating, chemical resistance, and productivity of the thermoplastic resin composition is superior. In addition, when the copolymer mixture (B) comprises the graft copolymer (b2), balance of bending property and impact resistance of the obtained molded body is more superior.

In addition, content of the copolymer mixture (B) is preferably 5 to 95 parts by mass, more preferably 10 to 80 parts by mass, and still more preferably 20 to 70 parts by mass, based on 100 parts by mass of total of the aromatic polycarbonate (A) and the copolymer mixture (B). When the content of the copolymer mixture (B) is 5 parts by mass or more, molding processability and image clarity after coating tend to be more superior. In addition, when the content of the copolymer mixture (B) is 95 parts by mass or less, impact resistance and heat resistance tend to be more superior.

Content of the vinyl cyanide-based monomer in the copolymer mixture (B) is preferably 3 to 65 parts by mass, more preferably 5 to 55 parts by mass, and still more preferably 8 to 50 parts by mass, based on 100 parts by mass of total of the components other than the rubbery polymer. When the content of the vinyl cyanide-based monomer is 3 parts by mass or more, impact resistance, scratch resistance, image clarity after coating, and chemical resistance of the obtained molded body tend to be more superior. In addition, when the content of the vinyl cyanide-based monomer is 65 parts by mass or less, productivity and molding processability of the thermoplastic resin composition tend to be more superior.

(Copolymer (b1))

The copolymer (b1) comprises the vinyl cyanide-based monomer, and one or more kinds of monomers copolymerizable with the vinyl cyanide-based monomer.

The above-described vinyl cyanide-based monomer is not particularly limited, and includes, for example, acrylonitrile and methacrylonitrile etc. Among these, acrylonitrile is preferable. When these vinyl cyanide-based monomers are used, image clarity after coating tends to be more superior.

The above-described monomer copolymerizable with the above-described vinyl cyanide monomer is not particularly limited, and includes, for example, an aromatic vinyl monomer, such as styrene, α-methylstyrene, o-methylstyrene, p-methylstyrene, ethylstyrene, p-t-butylstyrene, and vinylnaphthalene; a (meth)acrylate ester-based monomer, such as methyl (meth)acrylate, ethyl (meth)acrylate, and butyl (meth)acrylate; an acrylic acid-based monomer, such as acrylic acid and methacrylic acid; an N-substituted maleimide-based monomer, such as N-phenylmaleimide, and N-methylmaleimide; a glycidyl group-containing monomer, such as glycidyl methacrylate, etc. These may be used alone, or in combination of two or more kinds. Among these, styrene, α-methylstyrene, methyl acrylate, ethyl acrylate, butyl acrylate, methyl methacrylate, N-phenylmaleimide, and glycidyl methacrylate are preferable. By using these monomers, molding processability and productivity tend to be more superior.

Content of the above-described copolymer (b1), although it depends on ratio of the aromatic polycarbonate (A) and the copolymer mixture (B), is preferably 10 to 90 parts by mass, more preferably 15 to 80 parts by mass, and still more preferably 20 to 60 parts by mass, based on 100 parts by mass of the thermoplastic resin composition. When the content of the copolymer (b1) is 10 parts by mass or more, molding processability and image clarity after coating tend to be more improved. In addition, when the content of the copolymer (b1) is 90 parts by mass or less, heat resistance tends to be more improved.

A production method of the copolymer (b1) is not particularly limited, and it may be produced by any conventionally known methods.

(Graft Copolymer (b2))

The graft copolymer (b2) comprises a vinyl cyanide-based monomer, one or more kinds of monomers copolymerizable with the vinyl cyanide-based monomer, and a rubbery polymer.

Examples of the vinyl cyanide-based monomer contained in the graft copolymer (b2), and one or more kinds of monomers copolymerizable with the vinyl cyanide-based monomer include the same monomers as those exemplified above with respect to copolymer (b1).

The rubbery polymer is not particularly limited, and includes, for example, diene-based rubber, acrylic-based rubber, ethylene-based rubber, etc. Such a rubbery polymer, specifically, includes polybutadiene, a butadiene-styrene copolymer, a butadiene-acrylonitrile copolymer, a butadiene-acrylic copolymer, a styrene-butadiene-styrene block-copolymer, an acrylonitrile-styrene-butadiene copolymer, polyisoprene, a styrene-isoprene copolymer, and a hydrogenated product thereof, ethyl acrylate, butyl acrylate, an ethylene-α-olefin-polyene copolymer, an ethylene-α-olefin copolymer, silicone rubber, silicone-acrylic rubber, etc. Among these, polybutadiene, polyisoprene, a butadiene-styrene copolymer, a butadiene-acrylonitrile copolymer, a butadiene-acrylic copolymer, an acrylonitrile-styrene-butadiene copolymer, acrylic-based rubber, an ethylene-α-olefin-polyene copolymer, an ethylene-α-olefin copolymer, silicone rubber, and silicone-acrylic rubber are preferable. Polybutadiene, a butadiene-styrene copolymer, a butadiene-acrylonitrile copolymer, and an acrylonitrile-styrene-butadiene copolymer are more preferable. These may be used alone, or in combination of two or more kinds.

The rubbery polymer may have a homogeneous composition, or may contain polymers with different composition. In addition, it may have a continuously-varied composition.

In the case where the rubbery polymer is a copolymer of the vinyl cyanide-based monomer, and one or more kinds of copolymerizable monomers, embodiment of the copolymer may be any of conventionally known ones. Specifically, it includes a random copolymer, a tapered copolymer, a block copolymer, a graft copolymer, etc. It should be noted that a production method of the rubbery polymer is not particularly limited, and it may be any conventionally known methods. Specifically, it includes mass polymerization, solution polymerization, emulsion polymerization, suspension polymerization, and a combination thereof, etc.

A production method of the graft copolymer (b2) is not particularly limited, and it includes, for example, an emulsion graft copolymerization method where the vinyl cyanide-based monomer, and one or more kinds of copolymerizable monomers are graft copolymerized to latex of the rubbery polymer produced by emulsion polymerization. The polymer mixture obtained by the emulsion graft copolymerization method may include the above-described graft copolymer (b2) and the above-described copolymer (b1). It should be noted that a production method of the graft copolymer component is not limited to the above-described method, and it may be any conventionally known method. Specifically, it includes mass polymerization, solution polymerization, emulsion polymerization, suspension polymerization, and a combination thereof, etc.

In addition, the copolymer mixture (B) may be obtained by mixing a copolymer mixture containing the graft copolymer (b2) and the copolymer (b1) obtained by the production method of the graft copolymer (b2), and the copolymer (b1) separately polymerized.

Ratio of the vinyl cyanide-based monomer graft copolymerized to the rubbery polymer, and one or more kinds of monomers copolymerizable with the vinyl cyanide-based monomer is preferably 60 to 200 parts by mass, more preferably 60 to 170 parts by mass, and still more preferably 70 to 170 parts by mass, based on 100 parts by mass of the rubbery polymer. The ratio of the vinyl cyanide-based monomer graft copolymerized to the rubbery polymer, and one or more kinds of monomers copolymerizable with the vinyl cyanide-based monomer can be calculated by the peak analysis obtained by a Fourier-transform infrared spectroscopy (FT-ER method).

Volume average particle size of the rubbery polymer which may be used in the present embodiment is preferably 50 to 1000 nm, more preferably 100 to 500 nm, and still more preferably 200 to 500 nm. When the volume average particle size is 50 nm or more, impact resistance tends to be more improved. In addition, when the volume average particle size is 1000 nm or less, impact resistance and glossiness tend to be more improved. The volume average particle size of the rubbery polymer can be measured by a method described in Examples.

Content of the rubbery polymer, although it depends on ratio of the aromatic polycarbonate (A) and the copolymer mixture (B), is preferably 1 to 30 parts by mass, more preferably 3 to 25 parts by mass, and still more preferably 5 to 20 parts by mass, based on 100 parts by mass of the thermoplastic resin composition. When the content of the rubbery polymer is 1 part by mass or more, impact resistance tends to be more improved. In addition, when the content of the rubbery polymer is 30 pars by mass or less, rigidity and heat resistance tends to be more improved.

Content of the graft copolymer (b2), although it depends on ratio of the aromatic polycarbonate (A) and the copolymer mixture (B), is preferably 1 to 30 parts by mass, more preferably 5 to 25 parts by mass, and still more preferably 5 to 15 parts by mass, based on 100 parts by mass of the thermoplastic resin composition. When the content of the graft copolymer (b2) is 1 part by mass or more, impact resistance tends to be more improved. In addition, when the content of the graft copolymer (b2) is 30 pars by mass or less, rigidity and heat resistance tends to be more improved.

(Acetone-Soluble Component)

The copolymer mixture (B) contains an acetone-soluble component. The acetone-soluble component has at least two peak tops, being peak top 1 and peak top 2, within the range of 15 to 50% of vinyl cyanide component content rate, in measurement of the vinyl cyanide component content rate by high performance liquid chromatography (HPLC). The peak top 1 is present in the range of from 15% or more to 30% or less of vinyl cyanide component content rate, and the peak top 2 is present in the range of from more than 30% to 50% or less of vinyl cyanide component content rate. Number of the peaks of the acetone-soluble component is preferably two or more in terms of productivity, and is preferably four or less from the viewpoint of balance of impact resistance, scratch resistance, image clarity after coating and productivity. Here, "vinyl cyanide component" means a vinyl cyanide-based monomer unit contained in a polymer component which dissolves in acetone.

Here, "acetone-soluble component" means a polymer component which dissolves in acetone and may be either homopolymer or copolymer. In addition, it may be one kind of polymer component or a mixture of two or more kinds of polymer components. When the thermoplastic resin composition pertaining to the present embodiment is dissolved in acetone, a solution is obtained which has a form where the acetone-soluble component and acetone-insoluble component are co-present in acetone. In this case, the acetone-soluble component and the acetone-insoluble component can be separated by a usually known method, such as filtration or centrifugal separation.

The acetone soluble component in the copolymer mixture (B) is not particularly limited, and includes, for example, a styrene-acrylonitrile copolymer, a styrene-acrylonitrile-methyl methacrylate copolymer, etc. It should be noted that it may be any polymer other than these polymers, as long as it is a polymer component substantially soluble in acetone.

In addition, the acetone insoluble component in the copolymer mixture (B) is not particularly limited, and specifically includes a butadiene-acrylonitrile copolymer, an acrylonitrile-styrene-butadiene copolymer, and a hydrogenated product thereof, etc.

The acetone-soluble component contained in the copolymer mixture (B) has at least two peak tops, being peak top 1 and peak top 2, within the range of from 15 to 50% of vinyl cyanide component content rate, in measurement of the vinyl cyanide component content rate by HPLC. Thereby, the thermoplastic resin composition superior in balance of image clarity after coating and adhesion of the coating film, impact resistance and balance of scratch resistance is obtained. It should be noted that there may be the case where the peak top is present in the range of less than 15% and/or over 50% of vinyl cyanide component content rate, and the skirt part of peak thereof is present within the range of 15% to 50% of vinyl cyanide component content rate, depending on composition of the acetone-soluble component. In this case, the skirt part of peak should not be contained in peak number. FIG. 1 shows a schematic diagram of a spectrum of the vinyl cyanide component content rate of the acetone-soluble component of the thermoplastic resin composition pertaining to the present embodiment, measured by high performance liquid chromatography (HPLC).

The peak top 1 is present in the range of from 15% or more to 30% or less of vinyl cyanide component content rate, preferably in the range of from 18% or more to 30% or less of vinyl cyanide component content rate, and more preferably in the range of from 20% or more to 28% or less of vinyl cyanide component content rate. When the peak top 1 is present in such a range, characteristics required to a product, such as superior impact resistance and easy formation of a fracture surface in ductile fracture, etc., can be satisfied, and furthermore coating film adhesion after coating is improved.

In addition, the peak top 2 is present in the range of from more than 30% to 50% or less of vinyl cyanide component content rate, preferably in the range of from 32% or more to 50% or less of vinyl cyanide component content rate, and more preferably in the range of from 33% or more to 48% or less of vinyl cyanide component content rate. When the peak top 2 is present in such a range, heat resistance and image clarity after coating is more improved. In addition, decrease in mechanical characteristics, such as impact resistance of the molded body, caused by thermal history, etc., can be suppressed more.

Moreover, the difference between the vinyl cyanide component content rate of the peak top 1 and the peak top 2 is preferably 5% or more, more preferably 7% or more, and still more preferably 10% or more. When the difference between the vinyl cyanide component content rate of the peak top 1 and the peak top 2 is 5% or more, balance of image clarity after coating and adhesion of the coating film, impact resistance and balance of and scratch resistance tend to be more superior.

It should be noted that in the case where there are multiple peak tops 1 and/or peak tops 2, the difference between the highest value of the vinyl cyanide component content rate among the peak tops 1, and the lowest value of the vinyl cyanide component content rate among the peak tops 2 shall be used as the above-described difference.

In addition, in the case where there are three or more peaks can be observed by HPLC, other peaks may be present anywhere, so long as the peak top 1 and the peak top 2 are present within the range of from 15% to 30% and in the range of from more than 30% to 50% or less, of vinyl cyanide component content rate, respectively.

The vinyl cyanide component content rate in the acetone-soluble component is calculated from the position of the peak top in a chart obtained by measurement of the acetone-soluble component by HPLC. In this measurement by HPLC, the vinyl cyanide component content rate in the styrene-acrylonitrile copolymer is measured, in advance, by a carbon atom nuclear magnetic resonance spectrometry ($^{13}$C-NMR) and a calibration curve is prepared from relationship of the vinyl cyanide component content rate and HPLC retention time, using plural standard samples having the different vinyl cyanide component content rate. After that, the acetone-soluble component is separated by HPLC, as a sample, to calculate the vinyl cyanide component content rate in the acetone-soluble component, from relationship of the calibration curve and retention time.

A solvent to be used in the HPLC measurement is not particularly limited, as long as it dissolves the acetone-soluble component of the thermoplastic resin composition of the present embodiment, and it is a solvent to be used in analysis of HPLC, and specifically, the example includes tetrahydrofuran, etc.

Ratio of the peak area of the peak top 1, and the peak area of the peak top 2 (the peak area of the peak top 1/the peak area of the peak top 2) is preferably from 90/10 to 10/90, more preferably from 75/25 to 25/75, and still more preferably from 65/35 to 35/65. When the area ratio is 90/10 or less, image clarity after coating tends to be more superior. In addition, when the area ratio is 10/90 or more, adhesion of the coating film tends to be more superior.

In calculation of the area of the peak of the peak top 1 and the area of the peak of the peak top 2, there may be the case where the skirt of each peak exceeds in the range of from 15% or more to 30% or less of vinyl cyanide component content rate, and exceeds the range of from more than 30% to 50% or less of vinyl cyanide component content rate. In this case, the part exceeding the range is not counted in the peak area.

It should be noted that the peak top 1 can be controlled so as to be present in the range of from 15% or more to 30% or less of vinyl cyanide component content rate, or the peak top 2 can be controlled so as to be present in the range of from more than 30% to 50% or less of vinyl cyanide component content rate, by method 1 of polymerizing by continuously changing the monomer composition in producing the copolymer mixture (B), or method 2 of polymerizing the copolymer (b1) having the peak top 1 and the copolymer (b1) having the peak top 2 independently, and mixing them by a conventionally known method, such as melt kneading. It should be noted that these methods may be combined. Among these methods, the method 2 is preferable. When the method 2 is carried out, productivity, including the quality stability of the copolymer in production tends to be superior.

Reduced viscosity ($\eta$sp/c) of the acetone-soluble component is preferably 0.2 to 2.0 dl/g, more preferably 0.3 to 1.5 dl/g, and still more preferably 0.3 to 1.3 dl/g. When the reduced viscosity is 0.2 dl/g or more, impact resistance or strength tends to be more superior. In addition, when the reduced viscosity is 2.0 dl/g or less, molding property or productivity tends to be more superior.

It should be noted that the acetone soluble component in the whole thermoplastic resin composition is not particularly limited, and includes, for example, a styrene-acrylonitrile copolymer, a styrene-acrylonitrile-methyl methacrylate copolymer, polycarbonate, etc. Still more, it includes a (co)polymer etc. compatible with the copolymer (b1), like polymethyl methacrylate, a methyl methacrylate-acrylic acid copolymer, a methyl methacrylate-methyl methacrylate copolymer, etc., however, it may be any polymers other than these, as long as it is a polymer component substantially soluble in acetone.

In addition, the acetone insoluble component in the whole thermoplastic resin composition is not particularly limited, and includes, for example, polybutadiene, a butadiene-styrene copolymer, a butadiene-acrylonitrile copolymer, an acrylonitrile-styrene-butadiene copolymer, a butadiene-acrylic copolymer, a butadiene-styrene-acrylic copolymer, a styrene-butadiene-styrene block copolymer, polyisoprene, a styrene-isoprene copolymer, and a hydrogenated product thereof, etc.

[Rubbery Polymer]

The thermoplastic resin composition may still more contain a not-graft polymerized rubbery polymer. When it contains the rubbery polymer, balance of impact resistance, scratch resistance, image clarity after coating, and productivity tends to be more superior. In addition, when it contains the rubbery polymer, risk of for example, incised wound of human skin, etc., caused by fracture surface after fracture of the molded article tends to be lowered, due to ductile fracture of the fracture surface, in the case of fracture of the molded article by side impact. It should be noted that the rubbery polymer includes the one similar to those described in the above-described graft polymer (b2).

[Mg, Al and Ca]

The thermoplastic resin composition further contains at least one kind of metal atom selected from the group consisting of Mg, Al and Ca. Total content of these metal atoms is 10 to 1000 ppm, preferably 50 to 900 ppm, more preferably 100 to 750 ppm, and still more preferably 252 to 437 ppm, based on 100 parts by mass of total amount of the aromatic polycarbonate (A) and the copolymer mixture (B). When the total content of the metal atoms is 10 ppm or more, heat resistance including deflection temperature under load of the thermoplastic resin composition is more improved. In addition, when the total content of the metal atoms is 1000 ppm or less, impact resistance of the thermoplastic resin composition is improved. Still more, impact resistance of the molded body, which is obtained after retaining a plasticized resin for certain period of time within a molding machine, is also improved. Contents of Mg, Al and Ca can be measured by a method described in Examples.

At least one kind of metal atom selected from the group consisting of Mg, Al and Ca may derive from, for example, a metal contained in a trace amount in water used in producing the aromatic polycarbonate (A) and the copolymer mixture (B) (e.g. one derived from an emulsifier or a suspension agent in production by emulsion polymerization or suspension polymerization); or a residue of a catalyst etc. used in production; a residue of a salting out agent used in a recovering step (salting out step) of a resin component from latex, as a solid content, in the case where a polymer is produced by emulsion polymerization; a colorant or a compound to be added as an additive component; or a metal contained in strand cooling water in pelletizing these by melt-kneading; and a transportation piping, etc.

A method for reducing the contents of Mg, Al and Ca in the thermoplastic resin composition is not particularly limited, and includes, for example, a method of using a production method, where content of metal compounds is relatively low, for example, like mass polymerization or solution polymerization, in producing the aromatic polycarbonate (A), the copolymer mixture (B); a method of reducing the addition amount of the metal compounds as low as possible at the time of production; a method of carrying out water washing sufficiently using deionized water in water washing, in the case of using water-soluble metal compounds; a method of increasing dehydration ratio after water washing as high as possible; a method of using the additives containing low amount of Mg, Al and Ca, or the additives not containing Mg, Al and Ca; etc.

Among these method, in the case of using the water-soluble metal compounds, the method of carrying out water washing sufficiently using deionized water in water washing; the method of increasing dehydration ratio after water washing as high as possible; and the method of using the additives containing low amount of Mg, Al and Ca, or the additives not containing Mg, Al and Ca are efficient for removal of the metal compounds, and also preferable in terms of productivity because of not requiring special equipment. These methods may be used singly, or in combination of two or more thereof.

In addition, in producing the thermoplastic resin composition, the copolymer mixture (B) can be prepared by emulsion polymerization, in terms of stability and property balance of the composition. In this case, the one having large influence on content of Mg, Al and Ca in the thermoplastic resin composition is the one derived from the salting out agent that is used in the recovering step (salting out step) of the resin component as a solid content from latex, in consideration of amount of the metal compounds to be used. The content of Mg, Al and Ca can be reduced by the method of carrying out water washing sufficiently using deionized water in water washing; the method of carrying out water washing plural times; and the method of increasing dehydration ratio after water washing as high as possible, because the salting out agent in this case is the water-soluble metal compound. In addition, a method of using a compound, such as sulfuric acid not containing a metal, etc., as the salting out agent, is preferably used. These methods may be used singly or in combination of two or more thereof.

[Morphology]

The thermoplastic resin composition is preferable to have one phase comprising the aromatic polycarbonate (A), and two phases comprising the copolymer (b1), in morphology of the cross-section that is observed by a transmission electron microscope (hereafter it may also be referred to as "TEM"). In addition, it is preferable that the two phases comprising the copolymer (b1) contain the rubbery polymer having a volume average particle size of 50 to 1000 nm, respectively. Specifically, it is preferable that the graft copolymer (b2) is contained in both of the two phases comprising the copolymer (b1). By such morphology, impact resistance and scratch resistance tend to be more superior. Morphology can be controlled by molding temperature and molding method.

Specific example of morphology is not particularly limited, and includes, for example, the case where the aromatic polycarbonate (A) is present as a continuous phase and the two phases comprising the copolymer (b1) are independently present as dispersed phases; the case where the aromatic polycarbonate (A) is present as a continuous phase and the two phases comprising the copolymer (b1) are present as different phases in one dispersed phase; the case where the aromatic polycarbonate (A) and one phase comprising the copolymer (b1) are present as a co-continuous phase, and another phase comprising the copolymer (b1) is present as a dispersed phase; the case where the aromatic polycarbonate (A) and both of the two phases comprising the copolymer (b1) are present as a co-continuous phase; the case where the one phase comprising the copolymer (b1) is present as a continuous phase and the aromatic polycarbonate (A) and another phase comprising the copolymer (b1) are present independently as dispersed phases; the case where the one phase comprising the copolymer (b1) is present as a continuous phase and the aromatic polycarbonate (A) and the phase comprising the copolymer (b1) are present as different phases in one dispersed phase; and the case where the two phases comprising the copolymer (b1) are present as a co-continuous phase and the phase comprising the aromatic polycarbonate (A) is present as a dispersed phase. Of course any morphology other than these may be allowed as long as there are two different phases comprising the copolymer (b1).

Confirmation of presence of the two phases comprising the copolymer (b1) in addition to one phase of the aromatic polycarbonate can be implemented by processing and analysis of an image of the thermoplastic resin composition observed by TEM, using image analysis software.

Specifically it is implemented as follows. The thermoplastic resin composition is subjected to dyeing processing using a dyeing agent, such as osmium tetraoxide. The dyeing processing method may be any dying method, as long as the components having different vinyl cyanide content in the phase comprising the copolymer (b1) can be dyed in different colors. Specifically it includes a method of using osmium tetraoxide as the dyeing agent and changing dyeing time; a method of dyeing using two or more different dyeing agents, such as dyeing with ruthenium acid after dyeing with osmium tetraoxide; a method of changing irradiation time of electron beams that are irradiated in advance in TEM observation, etc. In particular, the method of dyeing with ruthenium acid after dyeing with osmium tetraoxide makes it easy to dye in different colors, the components having different vinyl cyanide contents, in phases other than the rubbery polymer in the copolymer mixture (B), and thus it is preferable.

After dyeing, ultrathin pieces are prepared to carry out TEM observation. In the obtained TEM observation image, a bright color part, an intermediate color part, a non-circular dark color part and a nearly circular dark color part may be observed. The nearly circular dark color part is the rubbery polymer. The fact that the rubbery polymer is contained in the thermoplastic resin composition can be confirmed by analyzing the thermoplastic resin composition using one or more of known analysis methods such as a nuclear magnetic resonance method (NMR method), a Fourier-Transform Infrared Spectroscopy (FT-IR method), a pyrolysis gas chromatography.

A TEM observation image obtained is uploaded into image analysis software, "A image kun" (trade name, manufactured by Asahi Kasei Engineering Co., Ltd.) to prepare a brightness histogram (brightness distribution) of the uploaded image and to carry out color coding processing of the TEM observation image.

The brightness histogram is prepared by taking brightness (brightness of each pixel) in the horizontal axis, and number of pixels showing each brightness in the vertical axis, where the minimum value in the horizontal axis is 0 and the maximum value in the horizontal axis is 255. In the obtained brightness histogram, there will be 3 or 4 peaks, and in the case where there are 4 peaks, each peak is defined as the dark color part, the intermediate color part-1, the intermediate color part-2, and the bright color part respectively in increasing order of brightness; and in the case where there are 3 peaks, each peak is defined as the intermediate color part-1, the intermediate color part-2, and the bright color part respectively in increasing order of brightness.

Figure 2:
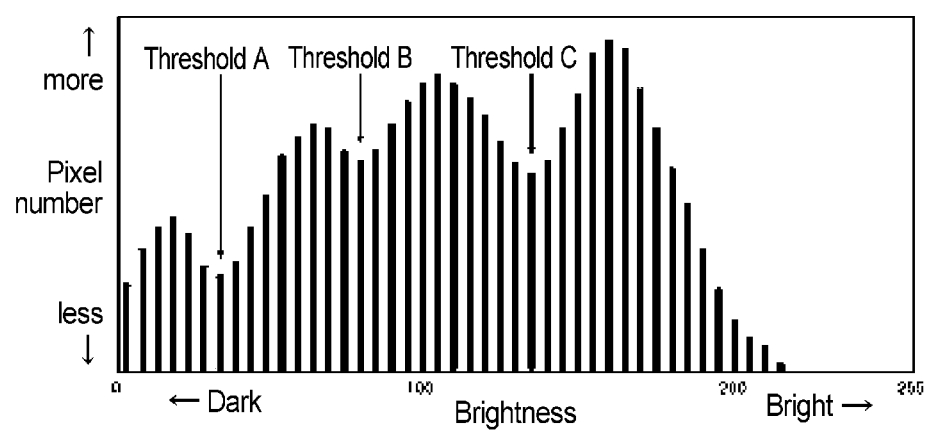
FIG. 2 is a schematic diagram of a brightness histogram analyzed by "A image kun" (trade name, manufactured by Asahi Kasei Engineering Co., Ltd.) of a TEM image of a thermoplastic resin composition pertaining to the present embodiment.

The dark color part is the rubbery polymer, the intermediate color part-1 is a phase comprising the copolymer (b1), and is a phase of a component corresponding to the peak top 1; the intermediate color part-2 is a phase comprising the copolymer (b1), and is a phase of a component corresponding to the peak top 2; and the bright color part is a phase comprising the aromatic polycarbonate (A). FIG. 2 shows a schematic diagram of the brightness histogram obtained by analyzing the TEM image of the thermoplastic resin composition using "A image kun" (trade name, manufactured by Asahi Kasei Engineering Co., Ltd.).

Color coding of the TEM observation image is carried out as follows using the obtained brightness histogram. In the brightness histogram obtained in analysis by "A image kun", in the case where there are 4 peaks, brightness at the valley between the peak of the dark color part and the peak of the intermediate color part-1, brightness at the valley between the peaks of the intermediate color part-1 and the intermediate color part-2, and brightness at the valley between the peaks of the intermediate color part-2 and the bright color part are set as threshold A, threshold B, threshold C, respectively. That is, a part having a brightness of 0 or more and below the threshold A is defined as the dark color part; a part having a brightness of the threshold A or more and below the threshold B is defined as the intermediate color part-1; a part having a brightness of the threshold B or more and below the threshold C is defined as the intermediate color part-2; and a part having a brightness of the threshold C or more and 255 or less is defined as the bright color part.

In addition, in the brightness histogram obtained in analysis by "A image kun", in the case where there are 3 peaks, brightness at the valley between the peaks of the intermediate color part-1 and the intermediate color part-2, and brightness at the valley between the peaks of the intermediate color part-2 and the bright color part are set as threshold B, and threshold C, respectively. That is, a part having a brightness of 0 or more and below the threshold B is defined as the intermediate color part-1; a part having a brightness of the threshold B or more and below the threshold C is defined as the intermediate color part-2; and a part having a brightness of threshold C or more and 255 or less is defined as the bright color part.

Further, the dark color part, the intermediate color part-1, the intermediate color part-2 and the bright color part in the TEM observation image can be color-coded by processing respective brightness using "A image kun".

From the color-coded TEM observation image, it can be confirmed whether the rubbery polymer is present in either part of the component corresponding to the peak top 1, or the component corresponding to the peak top 2, which are the phases other than the rubbery polymer in the copolymer mixture (B).

[Production Method of the Thermoplastic Resin Composition]

A production method of the thermoplastic resin composition pertaining to the present embodiment is not particularly limited, and includes, for example, a method of mixing the aromatic polycarbonate (A) and the copolymer mixture (B) using a conventionally known various mixing equipment which is generally used for a thermoplastic resin, such as a single screw or a twin screw extruder, a kneader, a Banbury mixer. Among these, an extruder with vent is preferable in terms of productivity, and a twin screw extruder with vent is preferable in terms of productivity and kneading property.

The thermoplastic resin composition may contain various additives, such as pigments, dyes, lubricants, antioxidants, ultraviolet absorbers, antistatic agents, reinforcing materials, fillers. Such additives are not particularly limited, and includes, for example, oils and fats, such as soybean oil, castor oil; a natural resin, such as rosin, copal; a processed resin, such as a petroleum rein; a synthetic resin, such as an alkyd resin, an acrylic resin, an epoxy resin, a polyurethane resin, a silicone resin, a fluoro resin; a rubber derivative, such as chlorinated rubber, cyclized rubber; a cellulose derivative, such as lacquer, acetylcellulose; etc. Among these, the synthetic resin, the rubber derivative, and the cellulose derivative are preferable.

In addition, additives other than the above-described one are not particularly limited, and include, for example, plasticizers, dispersing agents, antifoaming agents, antifungal agent, preservatives, drying agents, anti-sagging agents, matting agents, light resistance agents, ultraviolet absorbers, etc. Among these, antifungal agents, anti-sagging agents, light resistance agents, and ultraviolet absorbers are preferable.

On the other hand, in the case where the thermoplastic resin composition contains a bromine-based flame retardant, addition amount thereof is preferably 1 part by mass or less, on the basis of bromine contained in the bromine-based flame retardant, relative to 100 parts by mass of the thermoplastic resin composition.

In addition, content of volatile components having a boiling point of 200° C. or less in the thermoplastic resin composition is preferably 1500 ppm or less, more preferably 1000 ppm or less, and still more preferably 800 ppm or less. When the content of volatile components is 1500 ppm or less, decrease in image clarity after coating of the molded body consisting of the thermoplastic resin composition tends to be small, even after elapse of a long period of time.

The "volatile components" contained in the thermoplastic resin composition include a raw material monomer remaining in a resin or rubber, and a solvent to be used in the production process, etc. Such a volatile component includes, for example, an aromatic vinyl-based monomer, a vinyl cyanide-based monomer, an acrylic-based monomer, etc., and/or the additives containing a component having a boiling point of 200° C. or less, etc.

[Molded Body]

A molded body can be obtained by molding the thermoplastic resin composition of the present embodiment. A molding method for the thermoplastic resin composition is not particularly limited and, for example, a conventionally known molding method, such as injection molding, extrusion molding, vacuum compression molding, blow molding, and film inflation molding can be used. Among these, a molding body obtained using an injection molding machine is preferable in the viewpoint of improving surface flatness and productivity of the obtained molding body in addition to providing high degree of freedom with respect to product shape.

In addition, preset temperature of a heating cylinder at injection molding is preferably 230 to 300° C., more preferably 240 to 280° C., and still more preferably 240 to 260° C. When the preset temperature of the heating cylinder is 230° C. or more, morphology having two different phases comprising the copolymer (b1) in addition to one phase of the aromatic polycarbonate (A) can be formed, and thereby both of adhesion of the coating film and image clarity after coating can be improved. In addition, when the preset temperature of the heating cylinder is 300° C. or less, decomposition of the rubbery polymer or matrix contained in the thermoplastic resin composition, can be suppressed, and decrease in impact resistance of the molded body can be suppressed.

In addition, mold temperature in injection molding is preferably 40 to 100° C., and more preferably 60 to 80° C. When the mold temperature at injection molding is 40° C. or more, a desired molded body fitting exactly to the mold tends to be obtained, because the thermoplastic resin to be injected into the mold can be filled into the mold before solidification. In addition, when the mold temperature in injection molding is 100° C. or less, it tends to lead to improvement of productivity, because solidification time of the resin filled in the mold is short.

In the case of molding a molded body by injection molding, injection speed is preferably 30 to 120 mm/sec, and more preferably 50 to 75 mm/sec. When the injection speed is 30 mm/sec or more, a desired molded body fitting exactly to the mold tends to be obtained, because the thermoplastic resin can be filled before the thermoplastic resin solidify inside the mold. When the injection speed is 120 mm/sec or less, it tends to suppress generation of stripe patterns (silver streaks), which may cause a poor appearance, etc., on the surface of the molded body.

[Coated Molded Body]

The coated molded body of the present embodiment is the above-described molded body having at least one layer of a coating layer. It is also preferable that the molded body consisting of the thermoplastic resin composition is coated in enhancing design property and durability of the molded body. Coating is carried out at least one time, preferably three kinds of coating of primer coating for enhancing adhesion with the surface of the molded body, base coating as coloring, and top coating as protection of the coating film are carried out; or four kinds of coating of: primer coating for enhancing adhesion with the surface of the molded body, base coating as coloring, metallic coating for giving brightness, and top coating as protection of the coating film are carried out, then drying is carried out. Depending on design property or color tone required, color tone of base coating is changed, or presence or absence of metallic coating differs.

Examples of the coating method include a one-liquid coating method in which one kind of liquid containing only a main component without curing agent is coated, and a two-liquids coating method in which a mixed liquid of two kinds of liquid containing a main component and a curing agent is coated. A method of applying these coating materials is not particularly limited, and the examples include air spray coating, airless spray coating, electrostatic spray coating, electrodeposition coating, powder coating, curtain flow coating, roll coating, etc. Among these, air spray coating, airless spray coating, electrostatic spray coating, etc., are preferable. In the case of electrostatic spray coating, it is preferable to carry out electrostatic spray coating after carrying out pretreatment of conductive primer coating etc., in advance, so as to allow electrostatic coating.

Coating film thickness of the coating is preferably 1 to 100 μm, and more preferably 5 to 80 μm, per one layer. When the coating film thickness is 1 μm or more, masking effect of coating material can be obtained, and improvement of design property by coating tends to be obtained. In addition, when the coating film thickness is 100 μm or less, surface defect of the coating film tends to be difficult to occur.

In addition, in the case of metallic coating, coating film thickness is preferably 1 to 50 μm, and more preferably 1 to 35 μm, per one layer. When the coating film thickness is 1 μm or more, metallic tone can be obtained, and improvement of design by coating tends to be obtained. In addition, when the coating film thickness is 50 μm or less, a metallic pigment is dispersed uniformly and good appearance tends to be obtained.

A component contained in the coating material to be used in the coating is not particularly limited, and includes, for example, a pigment, a resin, additives, a solvent, etc. The pigment is not particularly limited and, for example, a pigment generally used for a resin can be used, and includes an organic pigment, an inorganic pigment, a metallic pigment, etc.

The organic pigment is not particularly limited, and includes, for example, an azo-based pigment, such as an azo lake pigment, a benzimidazoline pigment, a diarylide pigment, a condensed azo pigment; a phthalocyanine-based pigment, such as phthalocyanine blue, phthalocyanine green; a condensed polycyclic-based pigment, such as an isoindolin pigment, a quinophthalone pigment, a quinacridone pigment, a perylene pigment, an anthraquinone pigment, a perinone pigment, dioxazine violet.

The inorganic pigment is not particularly limited, and includes, for example, titanium oxide, carbon black, titanium yellow, an iron oxide-based pigment, ultramarine, cobalt blue, chromium oxide, spinel green, a lead chromate-based pigment, a cadmium-based pigment, etc.

The metallic pigment is not particularly limited, and includes, for example, a scale-like aluminum metallic pigment, a spherical aluminum pigment to be used for improving weld appearance, mica powder for pearl-like metallic tone, other pigment on which an inorganic polyhedral particle, such as glass, is coated with a metal by plating or sputtering, etc.

Total content of resins and additives contained in a coating material is preferably 35 to 45 parts by mass, based on 100 parts by mass of the coating material. In addition, content ratio (resin component/additive ratio) of the resins and the additives is preferably 70 to 95 parts by mass/30 to 5 parts by mass.

The solvent is mainly classified as a true solvent, a co-solvent, and a diluent. The true solvent is not particularly limited, and the examples include an aliphatic hydrocarbon-based solvent, such as mineral spirit; an aromatic hydrocarbon-based solvent, such as xylene; an ester-based solvent, such as ethyl acetate, n-butyl acetate. The co-solvent is not particularly limited, and the examples include an alcohol, such as methanol, ethanol, isopropanol. The diluent is not particularly limited, and the examples include toluene, etc.

It is preferable that boiling point of the solvent to be used in coating is changed depending on season or a resin as a major component of the coating material, and generally it is preferable to use a low boiling point solvent having a boiling point of below 100° C., or a middle boiling point solvent having a boiling point of 100 to 150° C. Content of the solvent is preferably 15 to 35 parts by mass, based on 100 parts by mass of the coating material.

The above-described components are used in combination for the coating material, and is not particularly limited, and the coating material is generally referred to as, for example, lacquer-based coating materials, urethane-based coatings, acrylic-based coating materials, silicone-based coating materials, fluorine-based coating materials, alkyd-based coating materials, epoxy-based coating materials, etc.

It is preferable to carry out a drying step after coating, in the viewpoint of discharging the solvent in a short period of time, or curing the coating material. Drying temperature is preferably 70 to 120° C. When the drying temperature is 70° C. or more, discharge time of the solvent can be more shortened. In addition, when the drying temperature is 120° C. or less, heat distortion of the molded body tends to be more suppressed.

The thermoplastic resin composition has characteristics of being superior in balance of impact resistance, image clarity after coating, and coating film adhesion. Therefore, it is preferable to be used as a product that catches human eyes, and is touched by human hands at indoor or outdoor, etc. Specific examples of the product include interior and exterior parts of an automobile, such as a door handle, door mirror cover switches, covers, garnishes, etc.; and parts of the electronic and electric appliances, such as a copying machine, a multifunctional machine, a personal computer, a mouse, a cellular phone, and a game machine; and parts of household electric appliances, such as a remote controller, an air conditioner, a television set, a refrigerator, a microwave oven, an electric pot, a cleaner, and a telephone set, etc.; housing equipment, such as a system kitchen, a system bath, a wash stand, sanitary equipment, a power meter a switchboard.

EXAMPLES

Explanation will be given more specifically below on the present embodiments with reference to Examples and Comparative Examples. However, the present embodiments should not be limited to the following Examples. Evaluations were carried out by the methods shown below.

(1) Measurement Method for Peak Top Position and Peak Area Ratio of the Acetone-Soluble Component The thermoplastic resin composition of the Examples and the Comparative Examples, and acetone were mixed to extract the acetone-soluble component. Next, an acetone-soluble component solution was obtained by precipitating an insoluble component by centrifugal separation. Acetone was evaporated from the obtained acetone-soluble component solution to obtain solid content of the acetone-soluble component. The obtained solid content was dissolved into tetrahydrofuran to obtain a sample.

Contents of vinyl cyanide components in a plurality of styrene-acrylonitrile copolymers were measured, in advance, by a carbon atom nuclear magnetic resonance ($^{13}$C-NMR) method. Measurement conditions were set as a measurement frequency of 50.1 MHz, and a cumulative number of 30000 times. Value obtained by dividing the total of integration value of the peak of 127 ppm derived from carbon atoms at 2, 4, 6 positions of the benzene ring in styrene, and integration value of the peak of 128 ppm derived from carbon atoms at 3, 5 positions of the benzene ring in styrene, with carbon numbers of 5, was used as standard of styrene content in the styrene-acrylonitrile copolymers. Integration value of the peak of 121 ppm derived from carbon of the nitrile group was used as standard of vinyl cyanide component content rate. The vinyl cyanide component content rate in the styrene-acrylonitrile copolymer was calculated from the integration value of the standard of styrene content and the integration value of the standard of vinyl cyanide component content rate. A calibration curve was prepared from relationship of the vinyl cyanide component content rate and HPLC retention time, using these styrene-acrylonitrile copolymers as standard samples.

Separation using HPLC (Shimadzu high performance liquid chromatograph, Prominence system, manufactured by Shimadzu Corp.) was conducted for the samples prepared as described above, and using Shimadzu Shim-pack CLC-CN (M) (trade name, manufactured by Shimadzu Corp.), as a column, to calculate the vinyl cyanide component content rate at the peak top from relationship of the calibration curve and retention time.

After that, a peak part, whose peak top was observed in the range of from 15% or more to 30% or less of vinyl cyanide component content rate, and a peak part, whose peak top was observed in the range of from more than 30% to 50% or less of vinyl cyanide component content rate, were cut out, from a profile of the vinyl cyanide component content rate obtained by HPLC measurement, to measure weight of each cut out part, and to determine their peak area ratios as percentage.

It should be noted that a "low AN peak" in Examples and Comparative Examples means a peak whose peak top is observed within the range of from 15% or more to 30% or less of vinyl cyanide component content rate. In addition, a "high AN peak" means a peak whose peak top is observed in the range of from more than 30% to 50% or less of vinyl cyanide component content rate. Still more, in Tables 1 and 2, ratio of the area of the low AN peak and the area of the high AN peak is described as low AN peak/high AN peak ratio.

It should be noted that the aromatic polycarbonate (A), etc., do not contain the vinyl cyanide-based monomer, therefore, it never influenced on the peak showing the vinyl cyanide component content rate derived from the copolymer, even when the aromatic polycarbonate is contained in the acetone-soluble component of the thermoplastic resin composition of Examples and Comparative Examples.

(2) Measurement Method of Reduced Viscosity

The copolymer mixture or the copolymer of the Production Examples 3 to 21, and acetone were mixed to extract the acetone-soluble component. Then, an acetone-soluble component solution was obtained by precipitating an insoluble component by centrifugal separation. Acetone was evaporated from the obtained acetone-soluble component solution to obtain solid content of the acetone-soluble component. Reduced viscosity ($\eta sp/c$) of a solution, where 0.25 g of solid content remained was dissolved in 50 mL of 2-butanone, was measured at 30° C., using a Cannon-Fenske type capillary.

(3) Measurement Method of Mg, Al and Ca Content

Five grams of the thermoplastic resin compositions of Examples and Comparative Examples were calcinated in a crucible for 20 minutes to obtain ash. The obtained ash was treated with 5 ml of aqua regia, filtered while diluting with pure water to obtain 100 mL of an aqueous solution.

The content of Mg, Al and Ca in the thermoplastic resin composition was calculated by measuring the ion concentration of Mg, Al and Ca in the obtained aqueous solution using a multi-element simultaneous measurement emission spectrometer (ICP-AES apparatus), ICPS-7500 (manufactured by Shimadzu Corp.), from the obtained ion concentration and weight (5 g) of the thermoplastic resin composition.

(4) Measurement Method of Volume Average Particle Size of Rubbery Polymer

Volume average particle size of the rubbery polymer was measured using a micro track particle size analyzer, "Nanotrac150" (trade name), manufactured by NIKKISO Co., Ltd.

(5) Observation of Morphology of Thermoplastic Resin Composition (TEM Observation)

The thermoplastic resin compositions of the Examples and the Comparative Examples were cut out, and the cross-section part thereof was dyed firstly with osmium tetraoxide ($OsO_4$), then an ultra thin piece was prepared. And then the ultra thin piece was dyed with ruthenium tetraoxide ($RuO_4$). The obtained ultra thin piece was used as a sample and observed by TEM.

A brightness histogram was prepared by analyzing the obtained TEM image, using the image analysis software, "A image kun" (trade name, manufactured by Asahi Kasei Engineering Co., Ltd.). In the brightness histogram prepared, two to four peaks were observed depending on the samples. Brightness at the valley of each peak was set as a threshold, and color coded in the number of colors corresponding to the number of peaks.

It should be noted that in the present Examples, the styrene-acrylonitrile copolymer or a styrene-acrylonitrile-butyl acrylate ternary copolymer was used as the copolymer of the vinyl cyanide-based monomer and one or more kinds of the copolymerizable monomers with vinyl cyanide-based monomer, therefore, in Tables 1 and 2, a phase comprising the copolymer (b1) of the vinyl cyanide-based monomer and one or more kinds of the copolymerizable monomers with vinyl cyanide-based monomer, observed by TEM, is described as an AS phase.

(6) Image Clarity after Coating

A flat plate having a size of 5 cm×9 cm and a thickness of 2.5 mm was injection molded using an injection molding machine, EC60N, manufactured by Toshiba Machine Co., Ltd., under conditions of cylinder temperature=250° C., and mold temperature=60° C. This flat plate was left for 24 hours under an atmosphere of 23° C. and a relative humidity of 50%. Then, after spray coating was carried out on the sample, using an acrylic coating material (Kanpe Lacquer-A red, trade name, a red color coating material, produced by Kanpe Hapio Co., Ltd.) as a coating material, evaluation of image clarity was carried out. Evaluation of image clarity was carried out in accordance with ASTM5767, using an image clarity measurement apparatus, ICM-ID (manufactured by Suga Test Instruments Co., Ltd.). The larger value shows the better image clarity.

(7) Coating Film Adhesion

A flat plate having a size of 5 cm×9 cm and a thickness of 2.5 mm was injection molded using an injection molding machine, EC60N, manufactured by Toshiba Machine Co., Ltd., under conditions of cylinder temperature=260° C., and mold temperature=60° C. In this time, a plasticized resin was formed into a flat plate through an injection route (gate). A side close to the injection route (gate) and a side opposite to the injection route (gate) of the molded flat plate were referred to as a gate side and a non-gate side, respectively. This flat plate was left for 24 hours under an atmosphere of 23° C. and a relative humidity of 50%. Then, after spray coating was carried out on the sample, using an acrylic coating material (Kanpe Lacquer-A red, trade name, a red color coating material, produced by Kanpe Hapio Co., Ltd.) as a coating material, evaluation of coating film adhesion was carried out. As the evaluation of the coating film adhesion, a cellophane tape peeling test was carried out, after making grid-like cross-cut (100 pieces of squares with a size of 1×1 mm), on the gate side and the non-gate side using a multi-cross-cutter. The evaluation was judged as follows by calculating the average of (number of unpeeled squares)/(number of squares) on the gate side and the non-gate side.

⊚: no peeling
○: less peeling, 1 to 5 squares
x: peeling, 6 or more squares (8) Charpy Impact Strength A test piece for ISO evaluation was injection molded using an injection molding machine, AS-100D, manufactured by Fanuc Corp., under conditions of cylinder temperature-260° C., and mold temperature=60° C. The obtained test piece was evaluated in accordance with ISO179, using a Charpy impact testing machine of hammer 10 J.

In addition, evaluation in the case where the thermoplastic resin composition was retained inside the molding machine, was carried out as follows. Charpy impact strength value measured by using a test piece molded just after replacing inside the cylinder of the injection molding machine with the plasticized thermoplastic resin was used as Charpy impact strength value without retention. In addition, Charpy impact strength value measured by using a test piece molded after 20 minutes of retention, after replacing inside the cylinder of the injection molding machine with the plasticized thermoplastic resin, was used as Charpy impact strength value after 20 minutes of retention.

(9) Discoloration During Retention ΔE

Similarly to the above-described (8), color difference ΔE was calculated from color coordinate measured value ($L^*_1$, $a^*_1$, $b^*_1$) of a test piece molded just after replacing inside the cylinder of the injection molding machine with the plasticized thermoplastic resin was used, and color coordinate measured value ($L^*_2$, $a^*_2$, $b^*_2$) of a test piece molded after 20 minutes of retention, and this value was used as retention discoloration ΔE. Calculation formula of ΔE value is as follows.

$$\Delta E = \{(L^*_1 - L^*_2)^2 + (a^*_1 - a^*_2)^2 + (b^*_1 - b^*_2)^2\}^{1/2}$$

(10) Falling Weight Impact Fracture Surface

A flat plate having a size of 5 cm×9 cm and a thickness of 2.5 mm was injection molded using an injection molding machine, EC60N, manufactured by Toshiba Machine Co., Ltd., under conditions of cylinder temperature=260° C., and mold temperature=60° C. This flat plate was left for 24 hours under an atmosphere of 23° C. and a relative humidity of 50%, and it was used as a sample. Using this sample, a falling weight impact test was carried out in accordance with JIS K7211-1976. The fracture surface was visually observed to judge as follows.

◦: ductile fracture without edge-like fracture surface
　x: brittle fracture with edge-like fracture surface

(11) Deflection Temperature Under Load

Deflection temperature under load was measured under condition of a load of 0.45 MPa, in accordance with ISO75-1, 2, using the test piece obtained in the above-described (8).

Production Example 1

Production of Polybutadiene Rubber Latex (LX-1)

95 parts by mass of a butadiene monomer, 5 parts by mass of acrylonitrile, 135 parts by mass of deionized water (iron concentration: less than 0.02 ppm), 3.0 parts by mass of potassium oleate, 0.3 part by mass of potassium persulfate, 0.2 part by mass of tertiary dodecyl mercaptan, and 0.18 part by mass of potassium hydroxide were housed into a pressure resistant container equipped with a stirrer, and temperature was raised up to 70° C. to initiate polymerization. Polymerization time was set to 15 hours, to obtain polybutadiene latex (LX-1) having 40 parts by mass of solid content. Volume average particle size of polybutadiene latex (LX-1) was 81 nm.

Production Example 2

Production of Polybutadiene Rubber Latex (LX-2)

Into the polybutadiene rubber latex (LX-1) obtained in Production example 1, 0.1 part by mass of an emulsifier of the following general formula (1) was added, based on 100 parts by mass of solid content of the polybutadiene rubber latex (LX-1), and after stirring for 5 minutes, 0.65 parts by mass of acetic acid was added. Then, 0.65 parts by mass of potassium hydroxide was added to obtain the polybutadiene rubber latex (LX-2). Volume average particle size of the polybutadiene rubber latex (LX-2) was 250 nm. In addition, the polybutadiene rubber latex (LX-2) does not contain coagulum (sticky coagulated mass), and was high concentration aggregated latex having a solid content of 37 parts by mass.

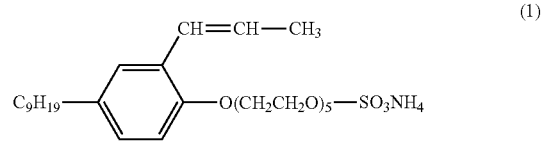

(1)

Production Example 3

Production of Graft Copolymer (b2-1)

Into a polymerization reaction tank, 135 parts by mass of LX-2 produced in Production example 2, 0.1 parts by mass of tertiary dodecyl mercaptan (t-DM), and 70 parts by mass of deionized water were added, and then, the gas phase was replaced with nitrogen. To this solution, a solution which was prepared by dissolving 0.0786 part by mass of sodium formaldehyde sulfoxylate (SFS), 0.0036 part by mass of ferrous sulfate ($FeSO_4$), and 0.0408 part by mass of a di-sodium salt of ethylene diamine tetra acetic acid (EDTA) into 20 parts by mass of deionized water was added, and then temperature thereof was raised up to 55° C. Subsequently, temperature of the solution was raised up to 70° C. taking 1.5 hours, and then, while maintaining the temperature for 3.5 hours, a monomer mixed solution composing of 20 parts by mass of acrylonitrile, 30 parts by mass of styrene, 0.15 part by mass of cumene hydroperoxide (peroxide agent; trade name: Percumyl H; produced by NOF Corp.), and 0.1 part by mass of t-DM, and an aqueous solution prepared by dissolving 0.1305 part by mass of SFS in 35 parts by mass of deionized water, were added. After completion of the addition, 0.02 part by mass of cumene hydroperoxide (peroxide agent, product name: Percumyl H; produced by NOF Corp.) was added, and then under controlling the reaction tank at a temperature of 70° C. for another hour, a polymerization reaction was completed to obtain latex composition.

After adding a silicone resin-based antifoaming agent (product name, TSA-737, produced by Momentive Performance Materials Japan, LLC.) and a phenol-based antioxidant emulsion (product name, WINGSTAYL, produced by Chukyo Yushi Co., Ltd.) into the obtained latex composition, an aluminum sulfate aqueous solution (numbers of aluminum sulfate parts in the aqueous solution: 2 parts by mass) was added for coagulation, and still more dehydration was carried out by a centrifugal separation method for 30 minutes, while washing with deionized water in a flow rate of 4 $m^3/h$. After that, dehydration was continued by the centrifugal separation method until the water content became 10 parts by mass, in a state that washing with deionized water was stopped. The graft copolymer (b2-1) was obtained by drying the remained component. Composition ratio of the mixture was 20.2% by mass of acrylonitrile, 50.8% by mass of butadiene, and 29.0% by mass of styrene, as a result of composition analysis using a Fourier Transform Infrared Spectroscope (FR-IR) (manufactured by JASCO Corp.), and average content (VCN) of components derived from acrylonitrile unit in components derived from styrene and acrylonitrile units excluding a diene-based rubbery polymer was 41.1% by mass. In addition, reduced viscosity measured by a measurement method of the above-described reduced viscosity was 0.39 dl/g.

It should be noted that in this Production example of the graft copolymer (b2-1), a copolymer consisting of acrylonitrile and styrene, and not containing the rubbery polymer, was also produced at the same time. This was also seen in the following Production examples.

Production Example 4

Production of Graft Copolymer (b2-2)

The graft copolymer (b2-2) was obtained by the same operation as in Production example 3, except for using an aqueous solution of magnesium sulfate (numbers of magnesium sulfate parts in the aqueous solution: 2 parts by mass) instead of an aqueous solution of aluminum sulfate to be added to the obtained latex. Composition ratio of the mixture was 20.1% by mass of acrylonitrile, 50.6% by mass of butadiene, and 29.3% by mass of styrene, as a result of composition analysis using a Fourier Transform Infrared Spectroscope (FR-IR) (manufactured by JASCO Corp.), and average content (VCN) of components derived from acrylonitrile unit in components derived from styrene and acrylonitrile units excluding a diene-based rubbery polymer was 40.7% by mass. In addition, reduced viscosity measured by a measurement method of the above-described reduced viscosity was 0.39 dl/g.

Production Example 5

Production of Graft Copolymer (b2-3)

The graft copolymer (b2-3) was obtained by the same operation as in Production example 3, except for using an aqueous solution of calcium chloride (numbers of calcium chloride parts in the aqueous solution: 2 parts by mass) instead of an aqueous solution of aluminum sulfate to be added to the obtained latex. Composition ratio of the mixture was 20.1% by mass of acrylonitrile, 50.6% by mass of butadiene, and 29.3% by mass of styrene, as a result of composition analysis using a Fourier Transform Infrared Spectroscope (FR-IR) (manufactured by JASCO Corp.), and average content (VCN) of components derived from acrylonitrile unit in components derived from styrene and acrylonitrile units excluding a diene-based rubbery polymer was 40.7% by mass. In addition, reduced viscosity measured by a measurement method of the above-described reduced viscosity was 0.39 dl/g.

Production Example 6

Production of Graft Copolymer (b2-4)

The graft copolymer (b2-4) was obtained by the same operation as in Production example 3, except for changing use amount of acrylonitrile to 13.5 parts by mass, and use amount of styrene to 36.5 parts by mass. Composition ratio of the mixture was 13.4% by mass of acrylonitrile, 50.3% by mass of butadiene, and 36.3% by mass of styrene, as a result of composition analysis using a Fourier Transform Infrared Spectroscope (FR-IR) (manufactured by JASCO Corp.), and average content (VCN) of components derived from acrylonitrile unit in components derived from styrene and acrylonitrile units excluding a diene-based rubbery polymer was 27.0% by mass. In addition, reduced viscosity measured by a measurement method of the above-described reduced viscosity was 0.41 dl/g.

Production Example 7

Production of Graft Copolymer (b2-5)

The graft copolymer (b2-5) was obtained by the same operation as in Production example 6, except for using an aqueous solution of magnesium sulfate (numbers of magnesium sulfate parts in the aqueous solution: 2 parts by mass) instead of an aqueous solution of aluminum sulfate to be added to the obtained latex. Composition ratio of the mixture was 13.6% by mass of acrylonitrile, 50.2% by mass of butadiene, and 36.2% by mass of styrene, as a result of composition analysis using a Fourier Transform Infrared Spectroscope (FR-IR) (manufactured by JASCO Corp.), and average content (VCN) of components derived from acrylonitrile unit in components derived from styrene and acrylonitrile units excluding a diene-based rubbery polymer was 27.3% by mass. In addition, reduced viscosity measured by a measurement method of the above-described reduced viscosity was 0.40 dl/g.

Production Example 8

Production of Graft Copolymer (b2-6)

The graft copolymer (b2-6) was obtained by the same operation as in Production example 6, except for using an aqueous solution of calcium chloride (numbers of calcium chloride parts in the aqueous solution: 2 parts by mass) instead of an aqueous solution of aluminum sulfate to be added to the obtained latex. Composition ratio of the mixture was 13.5% by mass of acrylonitrile, 50.0% by mass of butadiene, and 36.5% by mass of styrene, as a result of composition analysis using a Fourier Transform Infrared Spectroscope (FR-IR) (manufactured by JASCO Corp.), and average content (VCN) of components derived from acrylonitrile unit in components derived from styrene and acrylonitrile units excluding a diene-based rubbery polymer was 27.0% by mass. In addition, reduced viscosity measured by a measurement method of the above-described reduced viscosity was 0.41 dl/g.

Production Example 9

Production of Graft Copolymer (B2-7)

The graft copolymer (b2-7) was obtained by the same operation as in Production example 3, except for using an aqueous solution of aluminum sulfate (numbers of aluminum sulfate parts in the aqueous solution: 4 parts by mass) instead of an aqueous solution of aluminum sulfate to be added to the obtained latex, still more except for not carrying out the washing with deionized water in carrying out the dehydration by centrifugal separation. Composition ratio of the mixture was 20.1% by mass of acrylonitrile, 50.6% by mass of butadiene, and 29.3% by mass of styrene, as a result of composition analysis using a Fourier Transform Infrared Spectroscope (FR-IR) (manufactured by JASCO Corp.), and average content (VCN) of components derived from acrylonitrile unit in components derived from styrene and acrylonitrile units excluding a diene-based rubbery polymer was 40.7% by mass. In addition, reduced viscosity measured by a measurement method of the above-described reduced viscosity was 0.39 dl/g.

Production Example 10

Production of Graft Copolymer (b2-8)

The graft copolymer (b2-8) was obtained by the same operation as in Production example 9, except for using an aqueous solution of magnesium sulfate (numbers of magnesium sulfate parts in the aqueous solution: 4 parts by mass) instead of an aqueous solution of aluminum sulfate to be added to the obtained latex. Composition ratio of the mixture was 20.1% by mass of acrylonitrile, 50.6% by mass of butadiene, and 29.3% by mass of styrene, as a result of composition analysis using a Fourier Transform Infrared Spectroscope (FR-IR) (manufactured by JASCO Corp.), and average content (VCN) of components derived from acrylonitrile unit in components derived from styrene and acrylonitrile units excluding a diene-based rubbery polymer was 40.7% by mass. In addition, reduced viscosity measured by a measurement method of the above-described reduced viscosity was 0.39 dl/g.

Production Example 11

Production of Graft Copolymer (b2-9)

The graft copolymer (b2-9) was obtained by the same operation as in Production example 9, except for using an aqueous solution of calcium chloride (numbers of calcium chloride parts in the aqueous solution: 4 parts by mass) instead of an aqueous solution of aluminum sulfate to be added to the obtained latex. Composition ratio of the mixture was 20.1% by mass of acrylonitrile, 50.6% by mass of butadiene, and 29.3% by mass of styrene, as a result of composition analysis using a Fourier Transform Infrared Spectroscope (FR-IR) (manufactured by JASCO Corp.), and average content (VCN) of components derived from acrylonitrile unit in components derived from styrene and acrylonitrile units excluding a diene-based rubbery polymer was 40.7% by mass. In addition, reduced viscosity measured by a measurement method of the above-described reduced viscosity was 0.39 dl/g.

Production Example 12

Production of Graft Copolymer (b2-10)

The graft copolymer (b2-10) was obtained by the same operation as in Production example 6, except for using an aqueous solution of aluminum sulfate (numbers of aluminum sulfate parts in the aqueous solution: 4 parts by mass) instead of an aqueous solution of aluminum sulfate to be added to the obtained latex, still more except for not carrying out the washing with deionized water in carrying out the dehydration by centrifugal separation. Composition ratio of the mixture was 13.4% by mass of acrylonitrile, 50.3% by mass of butadiene, and 36.3% by mass of styrene, as a result of composition analysis using a Fourier Transform Infrared Spectroscope (FR-IR) (manufactured by JASCO Corp.), and average content (VCN) of components derived from acrylonitrile unit in components derived from styrene and acrylonitrile units excluding a diene-based rubbery polymer was 27.0% by mass. In addition, reduced viscosity measured by a measurement method of the above-described reduced viscosity was 0.41 dl/g.

Production Example 13

Production of Graft Copolymer (b2-11)

The graft copolymer (b2-11) was obtained by the same operation as in Production example 12, except for using an aqueous solution of magnesium sulfate (numbers of magnesium sulfate parts in the aqueous solution: 4 parts by mass) instead of an aqueous solution of aluminum sulfate to be added to the obtained latex, still more except for not carrying out the washing with deionized water in carrying out the dehydration by centrifugal separation. Composition ratio of the mixture was 13.6% by mass of acrylonitrile, 50.2% by mass of butadiene, and 36.2% by mass of styrene, as a result of composition analysis using a Fourier Transform Infrared Spectroscope (FR-IR) (manufactured by JASCO Corp.), and average content (VCN) of components derived from acrylonitrile unit in components derived from styrene and acrylonitrile units excluding a diene-based rubbery polymer was 27.3% by mass. In addition, reduced viscosity measured by a measurement method of the above-described reduced viscosity was 0.40 dl/g.

Production Example 14

Production of Graft Copolymer (b2-12)

The graft copolymer (b2-12) was obtained by the same operation as in Production example 6, except for using an aqueous solution of calcium chloride (numbers of calcium chloride parts in the aqueous solution: 4 parts by mass) instead of an aqueous solution of aluminum sulfate to be added to the obtained latex, still more except for not carrying out the washing with deionized water in carrying out the dehydration by centrifugal separation. Composition ratio of the mixture was 13.5% by mass of acrylonitrile, 50.0% by mass of butadiene, and 36.5% by mass of styrene, as a result of composition analysis using a Fourier Transform Infrared Spectroscope (FR-IR) (manufactured by JASCO Corp.), and average content (VCN) of components derived from acrylonitrile unit in components derived from styrene and acrylonitrile units excluding a diene-based rubbery polymer was 27.0% by mass. In addition, reduced viscosity measured by a measurement method of the above-described reduced viscosity was 0.41 dl/g.

Production Example 15

Production of Graft Copolymer (b2-13)

The graft copolymer (b2-13) was obtained by the same operation as in Production example 3, except for using an aqueous solution of sulfuric acid (numbers of sulfuric acid parts in the aqueous solution: 2 parts by mass) instead of an aqueous solution of aluminum sulfate to be added to the obtained latex. Composition ratio of the mixture was 20.2% by mass of acrylonitrile, 50.8% by mass of butadiene, and 29.0% by mass of styrene, as a result of composition analysis using a Fourier Transform Infrared Spectroscope (FR-IR) (manufactured by JASCO Corp.), and average content (VCN) of components derived from acrylonitrile unit in components derived from styrene and acrylonitrile units excluding a diene-based rubbery polymer was 41.1% by mass. In addition, reduced viscosity measured by a measurement method of the above-described reduced viscosity was 0.39 dl/g.

Production Example 16

Production of Graft Copolymer (b2-14)

The graft copolymer (b2-14) was obtained by the sane operation as in Production example 6, except for using an aqueous solution of sulfuric acid (numbers of sulfuric acid parts in the aqueous solution: 2 parts by mass) instead of an aqueous solution of aluminum sulfate to be added to the obtained latex. Composition ratio of the mixture was 13.4% by mass of acrylonitrile, 50.3% by mass of butadiene, and 36.3% by mass of styrene, as a result of composition analysis using a Fourier Transform Infrared Spectroscope (FR-IR) (manufactured by JASCO Corp.), and average content (VCN) of components derived from acrylonitrile unit in components derived from styrene and acrylonitrile units excluding a diene-based rubbery polymer was 27.0% by mass. In addition, reduced viscosity measured by a measurement method of the above-described reduced viscosity was 0.41 dl/g.

Production Example 17

Production of Copolymer (b1-1)

A monomer mixture consisting of 29.0 parts by mass of acrylonitrile, 40.5 parts by mass of styrene, 30.5 parts by mass of ethylbenzene, 0.3 part by mass of α-methylstyrene dimer, and 1.05 parts by mass of peroxide (ten-hour half-life temperature: 63.5° C.) having 7 repeating units shown by following chemical formula (2) was prepared while being sealed from the air, and continuously supplied into a reactor.

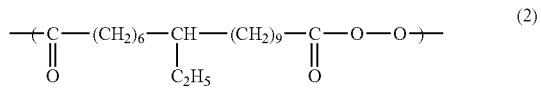
(2)

Polymerization temperature was adjusted to 120° C. The number of rotations of stirring was set to 95 rotations, and sufficient mixing was carried out. Average residence time was set to 4.0 hours. A solution having a polymerization ratio of 55%, and a polymer concentration of 50 parts by mass was continuously drawn out from the reactor and transferred to the first separation tank. The reaction mixture was heated to 160° C. by a heat exchanger, and devolatized under a degree of vacuum of 60 Torr to make the polymer concentration 65 parts by mass, and then discharged from the first separation tank and transferred to the second separation tank. The reaction mixture was heated to 260° C. by a heat exchanger, and devolatized under a degree of vacuum of 32 Torr to make the content of the volatile component in the reaction mixture 0.7 part by mass and to make the polymer component 99.4 parts by mass, and discharged to obtain a pellet-like product. Composition ratio of the copolymer was 39.5 parts by mass of acrylonitrile, and 60.5 parts by mass of styrene, as a result of composition analysis using a Fourier Transform Infrared Spectroscope. 0.5 g of the obtained copolymer was taken out and put into 10 mL of acetone, and shaken for 30 minutes, and then the whole amount of the copolymer was dissolved in acetone.

After evaporation of acetone of the obtained aqueous acetone solution, 0.25 g of the remained component was dissolved in 50 mL of 2-butanone. The reduced viscosity (ηsp/c) of the solution was measured at 30° C., using a Cannon-Fenske-based capillary. The reduced viscosity was 0.49 dl/g.

Production Example 18

Production of Copolymer (b1-2)

The copolymer (b1-2) was produced by the same operation as in Production example 17, except for changing the use amount to 18.5 parts by mass for acrylonitrile, 50.5 parts by mass for styrene, and 31.0 parts by mass for ethylbenzene. Composition ratio of the copolymer was 26.5 parts by mass of acrylonitrile, and 73.5 parts by mass of styrene, as a result of composition analysis using a Fourier Transform Infrared Spectroscope. 0.5 g of the obtained copolymer was taken out and put into 10 mL of acetone, and shaken for 30 minutes, and then the whole amount of the copolymer was dissolved in acetone.

After evaporation of acetone of the obtained aqueous acetone solution, 0.25 g of the remained component was dissolved in 50 mL of 2-butanone. The reduced viscosity (ηsp/c) of the solution was measured at 30° C., using a Cannon-Fenske-based capillary. The reduced viscosity was 0.48 dl/g.

Production Example 19

Production of Copolymer (b1-3)

A monomer mixture consisting of 33.2 parts by mass of acrylonitrile, 29.9 parts by mass of styrene, 8.1 parts by mass of butyl acrylate, 28.8 parts by mass of ethylbenzene, 0.3 part by mass of α-methylstyrene dimer, and 0.01 part by mass of t-butylperoxyisopropyl carbonate was prepared while being sealed from the air, and continuously supplied into a reactor. Polymerization temperature was adjusted to 142° C. The number of rotations of stirring was set to 95 rotations, and sufficient mixing was carried out, and stirring strength P/V was 4.0 kw/m³. Here, P (kw) means power required for stirring, and can be determined easily by measuring power consumption at mixing. In addition, V (m³) is space volume of a mixing part, and is space volume of a part which gives shear force to the solution. Average residence time was set to 1.65 hours. A solution having a polymerization ratio of 60%, and a polymer concentration of 50 parts by mass was continuously drawn from the reactor and transferred to the first separation tank. The solution was heated to 160° C. by a heat exchanger, and polymer concentration in the reaction mixture was made to 65 parts by mass by volatilization under a degree of vacuum of 60 Torr, and then discharged from the first separation tank and transferred to the second separation tank. The reaction mixture was heated to 260° C. by a heat exchanger, and content of the volatile component in the reaction mixture was made to 0.7 part by mass and polymer component to 99.4 parts by mass by volatilization under a degree of vacuum of 32 Torr, and discharged to obtain a pellet-like product. Composition ratio of the copolymer was 38.6 parts by mass of acrylonitrile, 50.3 parts by mass of styrene, and 8.4 parts by mass of butyl acrylate. 0.5 g of the obtained copolymer was taken out, put into 10 mL of acetone, and shaken for 30 minutes, then the whole amount of the copolymer was dissolved into acetone.

After evaporation of acetone of the obtained aqueous acetone solution, 0.25 g of the remained component was dissolved in 50 mL of 2-butanone. The reduced viscosity (ηsp/c) of the solution was measured at 30° C., using a Cannon-Fenske-based capillary. The reduced viscosity was 0.42 dl/g.

Production Example 20

Production of Copolymer (b1-4)

The copolymer (b1-4) was produced by the same operation as in Production example 17, except for changing use amount to 32.0 parts by mass for acrylonitrile, 37.0 parts by mass for styrene, and 31.0 parts by mass for ethylbenzene.

Composition ratio of the copolymer was 46.5 parts by mass of acrylonitrile, and 53.5 parts by mass of styrene, as a result of composition analysis using a Fourier Transform Infrared Spectroscope. 0.5 g of the obtained copolymer was taken out, put into 10 mL of acetone, and shaken for 30 minutes, the whole amount of the copolymer was dissolved into acetone.

After evaporation of acetone of the obtained aqueous acetone solution, 0.25 g of the remained component was dissolved in 50 mL of 2-butanone. The reduced viscosity ($\eta sp/c$) of the solution was measured at 30° C., using a Cannon-Fenske-based capillary. The reduced viscosity was 0.48 dl/g.

Production Example 21

Production of Copolymer (b1-5)

The copolymer (b1-5) was produced by the same operation as in Production example 17, except for changing use amount to 14.5 parts by mass for acrylonitrile, 54.5 parts by mass for styrene, and 31.0 parts by mass for ethylbenzene. Composition ratio of the copolymer was 20.5 parts by mass of acrylonitrile, and 79.5 parts by mass of styrene, as a result of composition analysis using a Fourier Transform Infrared Spectroscope. 0.5 g of the obtained copolymer was taken out, put into 10 mL of acetone, and shaken for 30 minutes, the whole amount of the copolymer was dissolved into acetone.

After evaporation of acetone of the obtained aqueous acetone solution, 0.25 g of remained component was dissolved in 50 mL of 2-butanone. The reduced viscosity ($\eta sp/c$) of the solution, was measured at 30° C., using a Cannon-Fenske-based capillary. The reduced viscosity was 0.49 dl/g.

Example 1

After drying sufficiently to remove moisture, 70 parts by mass of Panlite L-1225Y (trade name; produced by Teijin Chemicals Ltd.) as the aromatic polycarbonate(A), 10 parts by mass of the graft copolymer (b2-1), 5 parts by mass of the copolymer (b1-1), 15 parts by mass of the copolymer (b1-2), 0.5 part by mass of Sanwax E-250P (trade name, produced by Sanyo Chemical Ind., Ltd.: weight average molecular weight, 10,000: acid value, 20) and 0.5 part by mass of NUC 3195 (trade name; produced by Dow Chemical Japan Ltd.), as a slide adjuvant, were mixed, and then, put into a hopper, and kneaded under condition of the preset cylinder temperature of 250° C., a screw revolution number of 200 rpm and a discharge rate of the kneaded resin of 15 kg/hr, using a twin screw extruder (PCM-30, L/D=28, manufactured by Ikegai Corp.) to obtain a resin pellet. Evaluation was carried out using the obtained resin pellet. Each of the evaluation results is shown in Table 1.

Examples 2 to 20, and Comparative Examples 1 to 13

Resin pellets of Examples 2 to 20, and Comparative Examples 1 to 13 were obtained by the same way as in Example 1, except for setting the compositions described in Tables 1 and 2. Evaluation was carried out using the obtained resin pellets. Each of the evaluation results is shown in Tables 1 and 2.

TABLE 1

| | | | | | | | Examples | | | | | |
|---|---|---|---|---|---|---|---|---|---|---|---|---|
| | | | 1 | 2 | 3 | 4 | 5 | 6 | 7 | 8 | 9 | 10 |
| Aromatic policarbonate (A) | | | 70 | 70 | 70 | 70 | 50 | 50 | 50 | 50 | 50 | 50 |
| Copolymer mixture (b2) | b2-1 | | 10 | | 5 | 5 | 20 | | 10 | | | |
| | b2-2 | | | | | | | | | | | 10 |
| | b2-3 | | | | | | | | | | | |
| | b2-9 | | | | | | | | | | | |
| | b2-13 | | | | | | | | | 10 | 10 | |
| | b2-4 | | | 10 | 5 | | | 20 | 10 | 10 | | |
| | b2-5 | | | | | | | | | | | 10 |
| | b2-6 | | | | | | | | | | | |
| | b2-10 | | | | | 5 | | | | | 10 | |
| | b2-14 | | | | | | | | | | | |
| Copolymer (b1) | b1-1 | | 5 | 15 | 10 | 10 | 5 | 25 | 15 | 15 | 15 | 15 |
| | b1-2 | | 15 | 5 | 10 | 10 | 25 | 5 | 15 | 15 | 15 | 15 |
| | b1-3 | | | | | | | | | | | |
| Frame retardant | | | | | | | | | | | | |
| Peak top position of vinyl cyanide component distribution | | | 26.41 | 27.39 | 26.41 | 26.40 | 26.42 | 27.40 | 26.40 | 26.41 | 26.40 | 26.40 |
| Ratio of Low AN peak/Hihgh AN peak | | | 60/40 | 40/60 | 50/50 | 50/50 | 63/37 | 37/63 | 50/50 | 50/50 | 50/50 | 50/50 |
| Mg content (ppm) | | | 0 | 0 | 0 | 12 | 0 | 0 | 0 | 0 | 28 | 405 |
| Al content (ppm) | | | 141 | 138 | 142 | 302 | 278 | 279 | 278 | 125 | 443 | 0 |
| Ca content (ppm) | | | 4 | 3 | 4 | 29 | 8 | 8 | 8 | 4 | 68 | 32 |
| Total content of Mg, Al and Ca (ppm) | | | 145 | 141 | 146 | 343 | 285 | 287 | 286 | 129 | 539 | 437 |
| Number of AS phases | | | 2 | 2 | 2 | 2 | 2 | 2 | 2 | 2 | 2 | 2 |
| Image clarity (%) | | | 88 | 86 | 87 | 88 | 92 | 91 | 92 | 92 | 92 | 92 |
| Coating film adhesion | | | ◎ | ◎ | ◎ | ◎ | ◎ | ◎ | ◎ | ◎ | ◎ | ◎ |
| Charpy impact strength (kJ/m²) | no retension | | 73 | 86 | 82 | 83 | 61 | 63 | 58 | 59 | 56 | 55 |
| | retention of 20 mins. | | 68 | 78 | 78 | 75 | 55 | 58 | 54 | 57 | 45 | 53 |
| Discoloration during retention ΔE | | | 0.2 | 0.1 | 0.1 | 0.1 | 0.2 | 0.2 | 0.2 | 0.2 | 0.5 | 0.2 |
| Falling weight impact fracture surface | | | ○ | ○ | ○ | ○ | ○ | ○ | ○ | ○ | ○ | ○ |
| Deflection temperature under load (° C.) | | | 128 | 128 | 127 | 130 | 116 | 116 | 116 | 113 | 116 | 116 |

TABLE 1-continued

|  | | Examples | | | | | | | | | |
|---|---|---|---|---|---|---|---|---|---|---|---|
|  | | 11 | 12 | 13 | 14 | 15 | 16 | 17 | 18 | 19 | 20 |
| Aromatic policarbonate (A) | | 50 | 50 | 30 | 30 | 30 | 30 | 30 | 50 | 30 | 50 |
| Copolymer mixture (b2) | b2-1 |  | 10 | 30 |  | 15 |  |  |  |  | 10 |
|  | b2-2 |  |  |  |  |  | 15 |  |  |  |  |
|  | b2-3 | 10 |  |  |  |  |  | 15 |  |  |  |
|  | b2-9 |  |  |  |  |  |  |  |  |  | 10 |
|  | b2-13 |  |  |  |  |  |  |  | 10 | 15 |  |
|  | b2-4 |  | 10 |  | 30 | 15 |  |  |  |  |  |
|  | b2-5 |  |  |  |  |  | 15 |  |  |  |  |
|  | b2-6 | 10 |  |  |  |  |  | 15 |  |  |  |
|  | b2-10 |  |  |  |  |  |  |  |  |  |  |
|  | b2-14 |  |  |  |  |  |  |  | 10 | 15 |  |
| Copolymer (b1) | b1-1 | 15 | 10 | 5 | 35 | 20 | 20 | 20 | 15 | 20 | 15 |
|  | b1-2 | 15 | 15 | 35 | 5 | 20 | 20 | 20 | 15 | 20 | 15 |
|  | b1-3 |  | 5 |  |  |  |  |  |  |  |  |
| Frame retardant | |  |  |  |  |  |  |  |  |  | 10 |
| Peak top position of vinyl cyanide component distribution | | 26.40 | 26.41 | 26.41 | 26.42 | 26.42 | 26.42 | 26.42 | 26.41 | 26.40 | 26.40 |
| Ratio of Low AN peak/Hihgh AN peak | | 50/50 | 50/50 | 64/36 | 36/64 | 50/50 | 50/50 | 50/50 | 50/50 | 50/50 | 50/50 |
| Mg content (ppm) | | 2 | 0 | 0 | 0 | 0 | 612 | 2 | 0 | 0 | 0 |
| Al content (ppm) | | 24 | 289 | 423 | 422 | 421 | 0 | 32 | 0 | 0 | 251 |
| Ca content (ppm) | | 226 | 7 | 14 | 13 | 13 | 46 | 335 | 6 | 8 | 4 |
| Total content of Mg, Al and Ca (ppm) | | 252 | 296 | 437 | 435 | 434 | 658 | 369 | 6 | 8 | 255 |
| Number of AS phases | | 2 | 2 | 2 | 2 | 2 | 2 | 2 | 2 | 2 | 2 |
| Image clarity (%) | | 91 | 90 | 94 | 94 | 93 | 94 | 94 | 91 | 92 | 92 |
| Coating film adhesion | | ◉ | ◉ | ◉ | ◉ | ◉ | ◉ | ◉ | ◉ | ◉ | ◉ |
| Charpy impact strength (kJ/m$^2$) | no retension | 56 | 62 | 38 | 43 | 40 | 39 | 41 | 56 | 39 | 50 |
|  | retention of 20 mins. | 55 | 57 | 36 | 41 | 36 | 34 | 37 | 53 | 37 | 36 |
| Discoloration during retention ΔE | | 0.2 | 0.2 | 0.3 | 0.3 | 0.3 | 0.5 | 0.3 | 0.3 | 0.4 | 6 |
| Falling weight impact fracture surface | | ○ | ○ | ○ | ○ | ○ | ○ | ○ | ○ | ○ | ○ |
| Deflection temperature under load (° C.) | | 116 | 116 | 105 | 105 | 105 | 105 | 105 | 110 | 99 | 113 |

TABLE 2

|  | | Comparative examples | | | | | | |
|---|---|---|---|---|---|---|---|---|
|  | | 1 | 2 | 3 | 4 | 5 | 6 | 7 |
| Aromatic policarbonate (A) | | 70 | 70 | 50 | 50 | 50 | 50 | 50 |
| Copolymer mixture (b2) | b2-1 | 10 |  | 20 |  |  |  |  |
|  | b2-7 |  |  |  |  | 10 |  |  |
|  | b2-8 |  |  |  |  |  | 10 |  |
|  | b2-9 |  |  |  |  |  |  | 10 |
|  | b2-4 |  | 10 |  | 20 |  |  |  |
|  | b2-10 |  |  |  |  | 10 |  |  |
|  | b2-11 |  |  |  |  |  | 10 |  |
|  | b2-12 |  |  |  |  |  |  | 10 |
| Copolymer (b1) | b1-1 | 20 |  | 30 |  | 15 | 15 | 15 |
|  | b1-2 |  | 20 |  | 30 | 15 | 15 | 15 |
|  | b1-3 |  |  |  |  |  |  |  |
|  | b1-4 |  |  |  |  |  |  |  |
|  | b1-5 |  |  |  |  |  |  |  |
| Peak top position of vinyl cyanide component distribution | | 42 | 26 | 41 | 26 | 26.40 | 26.41 | 26.40 |
| Ratio of Low AN peak/Hihgh AN peak | | 0/100 | 100/0 | 0/100 | 100/0 | 50/50 | 50/50 | 50/50 |
| Mg content (ppm) | | 0 | 0 | 0 | 0 | 42 | 931 | 145 |
| Al content (ppm) | | 141 | 138 | 278 | 279 | 874 | 12 | 9 |
| Ca content (ppm) | | 4 | 3 | 8 | 8 | 143 | 274 | 1128 |
| Total content of Mg, Al and Ca (ppm) | | 145 | 141 | 286 | 287 | 1059 | 1217 | 1282 |
| Number of AS phases | | 1 | 1 | 1 | 1 | 2 | 2 | 2 |
| Image clarity (%) | | 87 | 64 | 90 | 53 | 92 | 89 | 91 |
| Coating film adhesion | | X | ◉ | X | ◉ | ◉ | ◉ | ◉ |
| Charpy impact strength | no retension | 78 | 91 | 59 | 65 | 7 | 5 | 6 |
|  | retention of 20 mins. | 66 | 78 | 57 | 63 | 4 | 1 | 4 |
| Discoloration during retention ΔE | | 0.2 | 0.1 | 0.2 | 0.1 | 0.2 | 0.2 | 0.2 |
| Falling weight impact fracture surface | | ○ | ○ | ○ | ○ | X | X | X |
| Deflection temperature under load (° C.) | | 128 | 126 | 117 | 114 | 116 | 116 | 116 |

TABLE 2-continued

| | | Comparative examples | | | | | |
|---|---|---|---|---|---|---|---|
| | | 8 | 9 | 10 | 11 | 12 | 13 |
| Aromatic policarbonate (A) | | 50 | 30 | 30 | 30 | 50 | 50 |
| Copolymer mixture (b2) | b2-1 | 20 | 30 | | | 20 | |
| | b2-7 | | | | 15 | | |
| | b2-8 | | | | | | |
| | b2-9 | | | | | | |
| | b2-4 | | | 30 | | | 20 |
| | b2-10 | | | | 15 | | |
| | b2-11 | | | | | | |
| | b2-12 | | | | | | |
| Copolymer (b1) | b1-1 | 25 | 40 | | 20 | | |
| | b1-2 | | | 40 | 20 | | |
| | b1-3 | 5 | | | | | |
| | b1-4 | | | | | 30 | |
| | b1-5 | | | | | | 30 |
| Peak top position of vinyl cyanide component distribution | | 38 | 41 | 26 | 26.41 | 40.46 | 21.26 |
| Ratio of Low AN peak/Hihgh AN peak | | 0/100 | 0/100 | 100/0 | 50/50 | 0/100 | 100/0 |
| Mg content (ppm) | | 0 | 0 | 0 | 64 | 0 | 0 |
| Al content (ppm) | | 278 | 422 | 427 | 1289 | 276 | 278 |
| Ca content (ppm) | | 8 | 15 | 14 | 123 | 8 | 8 |
| Total content of Mg, Al and Ca (ppm) | | 286 | 437 | 441 | 1476 | 285 | 286 |
| Number of AS phases | | 1 | 1 | 1 | 2 | 1 | 1 |
| Image clarity (%) | | 88 | 93 | 49 | 91 | 90 | 47 |
| Coating film adhesion | | X | X | ◎ | ◎ | X | ◎ |
| Charpy impact strength | no retension | 54 | 47 | 41 | 5 | 55 | 72 |
| | retention of 20 mins. | 50 | 45 | 38 | 2 | 56 | 68 |
| Discoloration during retention ΔE | | 0.2 | 0.3 | 0.3 | 0.3 | 0.2 | 0.2 |
| Falling weight impact fracture surface | | X | ○ | ○ | X | ○ | ○ |
| Deflection temperature under load (° C.) | | 116 | 106 | 103 | 106 | 116 | 114 |

It should be noted that the each phase comprising the copolymers (b1) of Examples contained the rubbery polymer having a volume average particle size of 50 to 1000 nm.

The present application is based on Japanese Patent Application No. 2013-090801 filed with the Japan Patent Office on Apr. 23, 2013 (Patent Application), and the content of which is incorporated herein by reference.

INDUSTRIAL APPLICABILITY

According to the present invention, a thermoplastic resin composition, having superior balance of impact resistance, image clarity after coating, coating film adhesion and scratch resistance after coating, can be obtained simply and conveniently, for applications, such as housings of electrical machinery and electronic equipment fields or OA equipment field, interior and exterior of household electrical appliances, exterior of game equipments, interior of automobiles, etc.

The invention claimed is:

1. A thermoplastic resin composition, comprising:
an aromatic polycarbonate (A);
a copolymer mixture (B) comprising a copolymer (b1) of a vinyl cyanide-based monomer and one or more kinds of monomers copolymerizable with said vinyl cyanide-based monomer, and a graft copolymer (b2) of a vinyl cyanide-based monomer, one or more kinds of monomers copolymerizable with said vinyl cyanide-based monomer and a rubbery polymer; and
at least one kind of metal atom selected from the group consisting of Mg, Al and Ca,
wherein the copolymer mixture (B) comprises an acetone-soluble component,
wherein said acetone-soluble component has at least two peak tops, being peak top 1 and peak top 2, within the range of 15 to 50% by mass of vinyl cyanide component content rate, when measuring the vinyl cyanide component content rate by high performance liquid chromatography,
wherein the peak top 1 is present in the range of 15% or more to 30% by mass or less of vinyl cyanide component content rate,
wherein the peak top 2 is present in the range of from more than 30% to 50% by mass or less of vinyl cyanide component content rate, and
wherein the total content of the metal atoms is 10 to 1000 ppm, based on 100 parts by mass of total amount of the aromatic polycarbonate (A) and the copolymer mixture (B).

2. The thermoplastic resin composition according to claim 1, wherein a ratio of the peak area of the peak top 1 to the peak area of the peak top 2 is 90/10 to 10/90.

3. The thermoplastic resin composition according to claim 1, wherein the difference between the vinyl cyanide component content rate of the peak top 1, and the vinyl cyanide component content rate of the peak top 2 is 5% by mass or more.

4. The thermoplastic resin composition according to claim 1, wherein volume average particle size of the rubbery polymer is from 50 to 1000 nm.

5. The thermoplastic resin composition according to claim 1, having one phase comprising the aromatic polycarbonate (A), and two phases comprising the copolymer (b1), in morphology observed by a transmission electron microscope.

6. A molded body obtained by injection molding of the thermoplastic resin composition according to claim 1 by a heating cylinder having a preset temperature of from 230 to 300° C.

7. A coated molded body comprising the molded body according to claim 6, wherein the molded body has at least one coated layer.

8. The thermoplastic resin composition according to claim 2, wherein the difference between the vinyl cyanide component content rate of the peak top 1, and the vinyl cyanide component content rate of the peak top 2 is 5% by mass or more.

9. The thermoplastic resin composition according to claim 2, wherein volume average particle size of the rubbery polymer is from 50 to 1000 nm.

10. The thermoplastic resin composition according to claim 3, wherein volume average particle size of the rubbery polymer is from 50 to 1000 nm.

11. The thermoplastic resin composition according to claim 2, having one phase comprising the aromatic polycarbonate (A), and two phases comprising the copolymer (b1), in morphology observed by a transmission electron microscope.

12. The thermoplastic resin composition according to claim 3, having one phase comprising the aromatic polycarbonate (A), and two phases comprising the copolymer (b1), in morphology observed by a transmission electron microscope.

13. The thermoplastic resin composition according to claim 4, having one phase comprising the aromatic polycarbonate (A), and two phases comprising the copolymer (b1), in morphology observed by a transmission electron microscope.

14. A thermoplastic resin composition, comprising:
an aromatic polycarbonate (A);
a copolymer mixture (B) comprising a copolymer (b1) of a vinyl cyanide-based monomer and one or more kinds of monomers copolymerizable with said vinyl cyanide-based monomer, and a graft copolymer (b2) of a vinyl cyanide-based monomer, one or more kinds of monomers copolymerizable with said vinyl cyanide-based monomer and a rubbery polymer; and
at least one kind of metal atom selected from the group consisting of Mg, Al and Ca,
wherein the copolymer mixture (B) comprises an acetone-soluble component,
wherein the copolymer (b1) is a mixture of a copolymer (b1-2) having a vinyl cyanide component content rate of from 15% or more to 30% by mass or less and a copolymer (b1-1) having a vinyl cyanide component content rate of from more than 30% to 50% by mass or less,
wherein said acetone-soluble component has at least two peak tops, being peak top 1 and peak top 2, within the range of 15 to 50% by mass of vinyl cyanide component content rate, when measuring the vinyl cyanide component content rate by high performance liquid chromatography,
wherein the peak top 1 is present in the range of 15% or more to 30% by mass or less of vinyl cyanide component content rate,
wherein the peak top 2 is present in the range of from more than 30% to 50% by mass or less of vinyl cyanide component content rate, and
wherein the total content of the metal atoms is 10 to 1000 ppm, based on 100 parts by mass of total amount of the aromatic polycarbonate (A) and the copolymer mixture (B).

* * * * *